United States Patent [19]

Cross et al.

[11] 4,006,465
[45] Feb. 1, 1977

[54] APPARATUS FOR CONTROL AND DATA TRANSFER BETWEEN A SERIAL DATA TRANSMISSION MEDIUM AND A PLURALITY OF DEVICES

[75] Inventors: Jon L. Cross, San Jose; Merle Edward Homan, Los Gatos; Guenther Keith Machol, Saratoga; Richard La Verne Malm, Los Gatos; Larry Eugene Svelund, San Jose, all of Calif.

[73] Assignee: International Business Machines Corporation, Armonk, N.Y.

[22] Filed: May 14, 1975

[21] Appl. No.: 577,495

[52] U.S. Cl. .......................................... 340/172.5
[51] Int. Cl.[2] ....................................... G06F 9/16
[58] Field of Search ............................... 340/172.5

[56] References Cited
UNITED STATES PATENTS

| | | | |
|---|---|---|---|
| 3,828,326 | 8/1974 | Cash | 340/172.5 |
| 3,842,405 | 10/1974 | Key et al. | 340/172.5 |

*Primary Examiner*—Gareth D. Shaw
*Assistant Examiner*—C. T. Bartz
*Attorney, Agent, or Firm*—Owen L. Lamb; Shelley M. Beckstrand

[57] ABSTRACT

Apparatus under microprocessor control for use in communicating over a serial communication loop with a remote attached control unit. It is capable of establishing frame synchronization, interpreting commands, assembling data and transmitting bits on the loop. The apparatus also communicates with I/O devices over a demand/response interface.

A microprocessor interface with the loop includes loop sync control which establishes bit synchronization and generates a restart pulse at bit receive time and bit send time. The execution of instructions by the microprocessor is stopped and the microprocessor enters a wait state when it has finished all previous work and is ready to receive a loop bit. When it is time to receive the loop bit the microprocessor is restarted in response to the restart pulse from the loop synchronization control.

For output operations to a device, the microprocessor loads the device address and a device command or data into shift registers and initiates the transfer by setting a latch. When the transfer to the device is completed, this latch is reset in response to a signal from the device.

29 Claims, 19 Drawing Figures

APPARATUS FOR CONTROL AND DATA TRANSFER BETWEEN A SERIAL DATA TRANSMISSION MEDIUM AND A PLURALITY OF DEVICES

CROSS REFERENCES TO RELATED APPLICATIONS

Co-pending patent application Ser. No. 482,940, now U.S. Pat. No. 3,921,137 issued Nov. 18, 1975 Semi-Static Time Division Multiplex Slot Assignment, C. M. McClearn, Jr. et al, filed June 25, 1974 and assigned to the assignee of this application.

Co-Pending patent application Ser. No. 577,507, Time Division Multiplexed Loop Communication System with Dynamic Allocation of Channels, R. A. Bowman et al, filed May 14, 1975 assigned to the assignee of this application, and issued as U.S. Pat. No. 3,961,139 on July 1, 1976.

BACKGROUND OF THE INVENTION

1. Field of the Invention

This invention relates to communication systems and more particularly to apparatus for use in establishing and maintaining communication with a controlling module which transmits data and control commands serially by bit over a serial transmission medium, and with one or more I/O modules over a demand/response I/O interface.

2. Description of the Prior Art

Serial communication media have been used for many years to control the transfer of data from a number of I/O modules, such as interactive terminals, and remote data processing systems. Early transmission media utilized serial telegraph, start-stop formats or synchronous serial data streams. More recently serial data transmission loops have been used wherein time slots are assigned to I/O terminals and messages to and from the terminals are transmitted in the assigned time slots.

In any of these techniques, there is a necessity to match the interactive, demand/response operation of a number of I/O terminals with the serial bit stream synchronization of the communication medium.

In addition to the problems which arise with respect to synchronizing different data formats, modern day technology requirements also impose constraints. In modern technology, circuit elements are interconnected and are inseparably associated with a continuous supporting material upon which the circuits are fabricated. The integrated circuit becomes part of a larger communication or data processing system. One of the problems associated with this type of circuitry is that there are a limited number of input/output access points or pins on the integrated circuit to provide external connections. Therefore, the need has arisen for a compact and simple data flow which involves the use of a minimum number of input/output lines. In order to reduce the number of integrated circuits necessary to fabricate an entire system, there is a need for as little logic as possible on the support material or substrate. The trend is therefore toward using a microprocessor wherein many of the functions formerly performed by hardware logic are performed by a sequence of micro-instructions. Therefore, it is important that a small instruction set be utilized.

A problem unique to the synchronization needs of adapting a serial medium with a demand/response terminal interface is that of sufficient interlock between the serial medium and the microprocessor and between the microprocessor and the terminal interface.

While the prior art devices have utilized microprocessors for controlling input/output operations they have not satisfactorily resolved the problems of adapting modern technology to the special problems associated with the synchronization of serial communication media with demand response input/output terminals.

BRIEF SUMMARY OF THE INVENTION

It is an object of this invention to provide an improved apparatus for use in establishing and maintaining communication with a control module which transmits data and control commands serially by bit over a serial transmission medium and with one or more I/O modules, such as interactive terminals, over a demand-/response interface connecting said modules.

A further object of this invention is to provide a microprocessor data path organization which utilizes a minimum amount of hardware logic.

It is another object of this invention to provide an interlock between a serial transmission medium and a microprocessor wherein the operation of the microprocessor is synchronized with bits of data received and transmitted over said medium.

A further object of this invention is to provide a means for interlocking the operation of a microprocessor and a demand/response interface between said microprocessor and a plurality of I/O modules.

A further object of this invention is to provide an input/output to a microprocessor which enables a serial data transmission path to be modified and bits received on said path to be retransmitted by said microprocessor with a minimum of logic circuitry.

The above objects are accomplished in accordance with the invention by providing a microprocessor comprised of a one bit arithmetic unit including an accumulator (a buffer) for storing the results of an arithmetic operation, which also serves as a temporary store of data bits received at the serial interface. An instruction set is chosen such that the buffer is also the implied destination of the arithmetic unit results. This dual port organization serves as a means of receiving serial data, modifying the data, and retransmitting the data of the serial interface.

In accordance with an aspect of the invention, synchronization between the serial transmission medium and the microprocessor is accomplished by an interlock which is activated by the microprocessor to stop the sequential interpretation of instructions until a bit is received, at which time a signal deactivates the interlock to thereby restart the program instructions.

In accordance with another aspect of the invention, communication between the microprocessor and a number of input/output modules over a demand response interface is accomplished by means of another interlock which is set by the microprocessor to thereby stop the sequential interpretation of instructions until a response is received from an I/O module to thereby restart the sequential interpretation of instructions after data has been transferred between the microprocessor and the I/O module.

The invention has the advantage that it provides a compact, simple dataflow which makes it especially adaptable to modern integrated circuit technology.

In addition, the invention provides a simple means for interlocking the transfer of data both between the serial input path and the microprocessor and the demand/response interface of the terminals and the microprocessor.

BRIEF DESCRIPTION OF THE DRAWINGS

The foregoing and other objects features and advantages of the invention will be apparent from the following detailed description of a preferred embodiment of the invention as illustrated in the accompanying drawings wherein:

FIG. 3a and b is a detailed logic diagram of the operation code decoder;

FIGS. 15 and 16 are timing diagrams of an input operation-polling and data in.

TABLE OF CONTENTS

I. Background of the Invention
II. Brief Summary of the Invention
III. Brief Description of the Drawings
IV. Introductory Description of the Invention
V. General Description of the Preferred Embodiment
   5.1 Instruction Set
   5.2 Latch and I/O Source/Destination
   5.3 RAM Source/Destination
   5.4 Latch and I/O Sources
   5.5 Latch Destinations
VI. Data Flow
   6.1 Source/Destination Decode
   6.2 Bus In
   6.3 Op-Code Decode, Alu & Branch
   6.4 Bus Out S/R's
   6.5 Bus Out Latches
   6.6 Latch Timing & Clock A
   6.7 Instruction Counter
   6.8 Poll/Bit Counter
   6.9 Loop Sync Control
   6.10 I/O Interface Logic (Output Operation)
   6.11 I/O Interface Logic (Input Operation)
   6.12 RAM
   6.13 ROM
   6.14 Wait Sync
   6.15 Clock Logic
VII. Microprogramming
   7.1 General
   7.2 Program Segments
   7.3 Tables
   7.4 Slot Sharing Example
VIII. Output Operation — Device Not Busy
IX. Output Operation — Device Busy or not equipped
X. Input Operation — Polling and Data In
XI. Summary

INTRODUCTORY DESCRIPTION OF THE INVENTION

Figure 1:
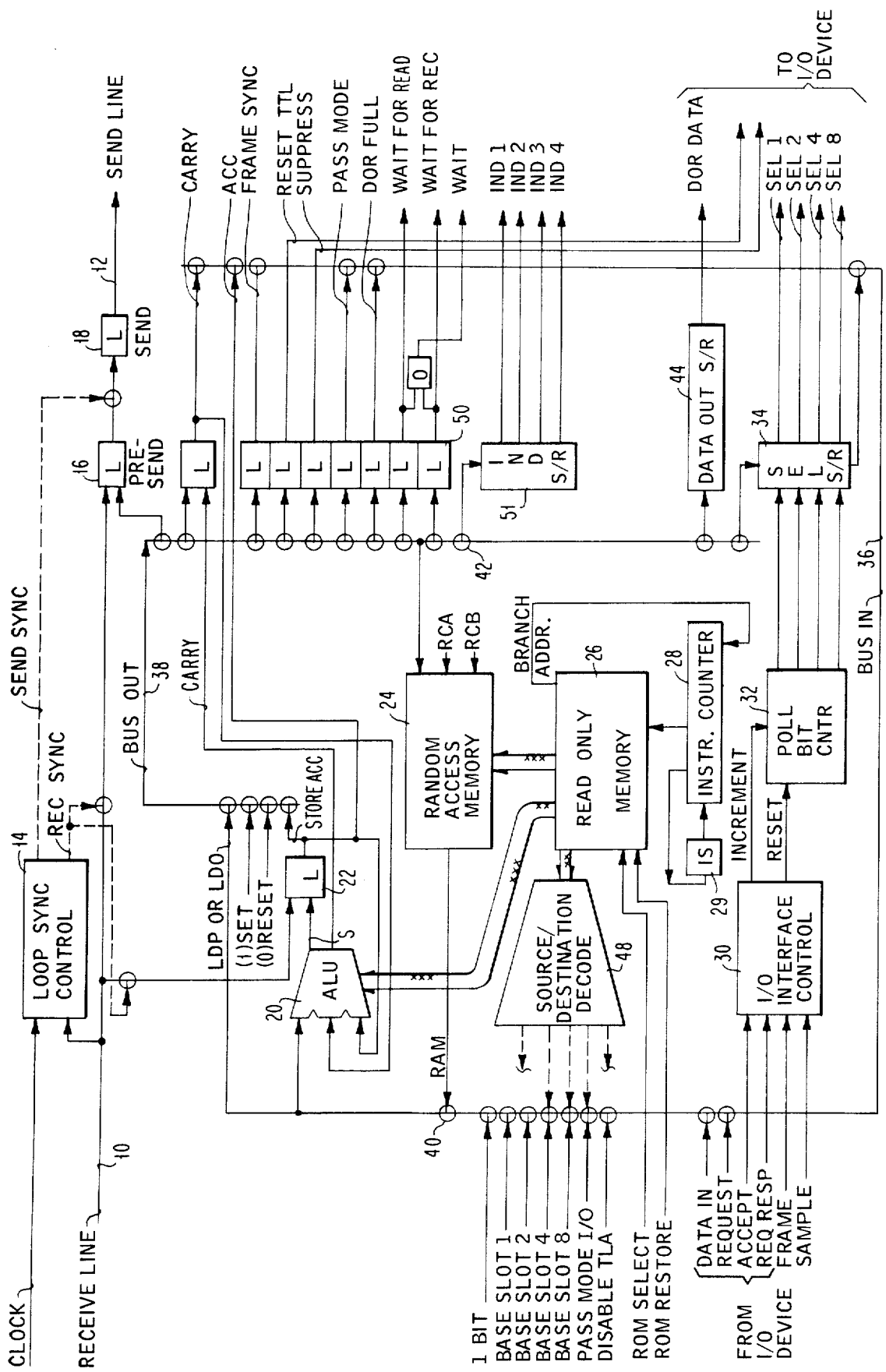
FIG. 1 is an overall block diagram of a terminal loop adapter in which the invention is embodied.

Referring to FIG. 1, an overall block diagram of a terminal loop adapter (TLA) in which the invention is embodied is shown. The terminal loop adapter is connected in series with a transmission loop as shown in the above-identified McClearn et al patent application. The loop connection is made by means of a receive line 10 which receives bits from the loop and a send line 12 which places bits on the loop. A loop sync control is provided for synchronizing data transmission in accordance with the McClearn et al application. The loop sync control generates a send sync and a receive sync line whereby the data are gated into and out of the TLA. A presend latch 16 is provided in series with a send latch 18 for buffering received bits prior to retransmission onto the loop.

The TLA is comprised of a microprocessor and various switched busses to perform the necessary control functions.

The Microprocessor includes an arithmetic logic unit 20 with an accumulator latch 22 which serves as both a receptacle for the results of arithmetic operations and as an input port for data bits received from the loop 10. A Random Access Memory (RAM) 24 is provided for working storage and a Read Only Memory (ROM) 26 is provided for storing instructions. An instruction counter 28 is provided for stepping through the instructions.

I/O devices (for example, interactive terminals) are attached to the TLA by means of an I/O interface control 30. This control also attaches to a poll bit counter 32 and a select shift register 34 for providing select information to the I/O devices for I/O device selection.

Data flow within the microprocessor is accomplished by means of two busses, a bus in 36, and a bus out 38. These busses are single wire busses and are connected to a plurality of source switches 40 and destination switches 42. The source switches are connected to a number of source lines and the destination switches are connected to a number of destination lines. One of the destination lines is connected to a data out shift register 44 for providing data in a format suitable for processing by an I/O device.

The gate input of the source and destination switches 40, 42 are connected to a source/destination decoder 48. The source/destination decoder is connected to the Read Only Memory and decodes instructions to thereby sequentially close or open respective switches to provide for data transfer control in accordance with information contained in the instructions.

In operation, the microprocessor interface to the loop 10 is gated to the microprocessor by means of a receive sync signal generated by the loop sync control 14. The loop sync control also generates restart pulses (not shown) at bit receive time and bit send time. The microprocessor steps sequentially through a microprogram under control of the instruction counter 28. The microprocessor enters a wait state when it is finished with all previous work and is ready to receive the next loop bit. This is accomplished by turning on the wait-for-receive latch in the group of latches 50. When it is time to receive the next bit, the loop sync control 14 generates a restart pulse which resets the wait-for-receive latch to thereby restart the microprocessor at the same point in the microprogram where it was stopped.

The microprocessor interface to the I/O devices is by means of the I/O interface control logic 30. For output operations to a device, the microprocessor loads the device address and device command or data into the select register 34 and the data out register 44 (DOR), respectively, and initiates transfer to the device by setting the DOR full latch in the group of latches 50. The I/O controls, upon receiving a valid accept signal from the device, transmit the contents of data out register 44 to the device. When the ninth bit has been sent, the interface controls 30 reset the DOR full latch. The microprocessor monitors the DOR latch to determine whether or not an I/O output operation has reached completion.

I/O devices initiate an input operation by raising the request line. The microprogram tests the state of this line by means of the appropriate source switch whenever it is ready to service an input request. The microprocessor initiates the input operation and places the processor in a wait state by turning on the wait-for-read latch in the group of latches 50. Since the source of the request is unknown, a polling operation is started by the I/O interface control logic 30 by means of the poll bit counter 32. The poll bit counter is connected to the select shift registers 34 and steps through a series of addresses until the address of the I/O device is found. Once the poll operation is complete the I/O device drops the request line and raises request response. Request response resets the wait-for-read trigger to thereby restart the microprocessor. The microprocessor resumes stepping through the sequential instructions to perform a data transfer from the data in line to the random access memory 24.

GENERAL DESCRIPTION OF THE PREFERRED EMBODIMENT

5.1 Instruction Set

1. LDA = LOAD ACCUMULATOR (from a Source)
2. ANA = AND with Accumulator (from a Source)
3. ORA = OR with Accumulator (from a Source)
4. OIA = OR with Accumulator (from a Source) and INVERT the result
5. LDO = LOAD DATA-OUT shift reg. (from a Source)
6. EBZ = EXCLUSIVE-OR with Acc. (from a Source) and BRANCH if the result is zero.

EBB = EXCLUSIVE-OR with Acc. (from a Source) and BRANCH if the result is one.

7. ADD = ADD with CARRY and ACC. (from a Source)

Bit $\oplus$ Carry $\oplus$ Acc. $\rightarrow$ Acc.

Bit · Carry + Bit · Acc. + Carry · Acc $\rightarrow$ Carry

8. LBZ = LOAD Accumulator (from a Source) and BRANCH if the result is zero.

LBB = LOAD Accumulator (from a Source) and BRANCH if the result is One

9. LDP = LOAD PRE-SEND (from a Source)
10. STA = STORE Accumulator (in a Destination)
11. RST — RESET Destination to ZERO
12. SET = SET Destination to ONE
13. UBR = BRANCH Unconditionally

5.2 Latch and I/O Source Destination

| ID | Source | Destination |
|---|---|---|
| SD-0 | "ZERO" | Spare |
| SD-1 | ACC | IND S/R |
| SD-2 | FRAME SYNC | FRAME SYNC |
| SD-3 | "ONE" | PROG RESET |
| SD-4 | DOR FULL | DOR FULL |
| SD-5 | PASS MODE | PASS MODE |
| SD-6 | BS-4 | SUPPRESS |
| SD-7 | REQUEST | Spare |
| SD-8 | DISABLE TLA | WAIT FOR READ |
| SD-9 | BS-1 | WAIT FOR REC |
| SD-10 | BS-2 | PRE SEND |
| SD-11 | CARRY | CARRY |
| SD-12 | BS-8 | DATA OUT S/R |
| SD-13 | SEL S/R | SEL S/R |
| SD-14 | DATA IN | Spare |
| Sd-15 | PASS MODE I/O | Spare |

5.3 RAM Source Destination

Random Access Memory (RAM) is available to the microprogram for the storage of data and control information. This memory is one bit wide and is accessed as a source by any source operation and as a destination by the Store, Reset and Set operations.

5.4 Latch and I/O Sources

SD-0 "ZERO" Source

Source "ZERO" supplies logical 0 for load or connective ops and arithmetic 0 for the ADD op.

No hardware is needed for this since it is conditioned by the absence of an ALU source input.

SD-1 "ACC" Source

The accumulator, which is the implied destination of all source operations, except LDO and LDP, can itself be used as a valid source in these same operations. For example LBB, ACC will act as a test and Branch on the bit in the accumulator. It will leave the contents of the Acc. unchanged.

SD-2 "FRAME SYNC" Source

The "FRAME SYNC" latch, as a source, may be interrogated to determine the current status as regards frame synchronization i.e. it may be used as a flag in the micro-code, SD-3 "ONE" Source Source "ONE" supplies logical 1 for load or connective ops and arithmetic 1 for the ADD op.

SD-4 "DOR FULL" Source

The "DOR FULL" latch is also a valid destination and when set "ON" it initiates an output operation to a device over the I/O Interface. The output operation is completed by autonomous hand shaking hardware on both sides of the I/O Interface. At the end of this sequence wherein the contents of the 9 Stage Data Out Shift Register are transferred over the interface to the selected device, the "DOR FULL" latch is reset. As a Source, it may be interrogated by the micro-program to determine whether or not this I/O Output Operation has reached completion.

SD-5 "PASS MODE" Source

The "PASS MODE" latch is also a valid Destination and may be set or reset by micro-code as a Flag indicating pass mode. It is also set by hardware in the I/O interface when an output operation is initiated to an unattached (not equipped) device. This hardware SET is active only if the PASS MODE I/O signal is in a down state, which case is produced by an external jumper to ground.

The micro-program therefore tests the PASS MODE latch to determine whether or not Pass Mode is indicated. In this mode, all received loop bits will be transmitted down the loop without alteration.

The PASS MODE I/O signal is also a valid Source and may therefore be interrogated by the micro-code.

SD-6 "BS-4" Source
SD-9 "BS-1" Source
SD-10 "BS-2" Source
SD-12 "BS-8" Source

These four Sources are normally up (zero significance) but will be down (One significance) if strapped to ground. This is done to assign an address. The lines are weighted 1, 2, 4 and 8 to provide 16 possible binary values. The assigned terminal address, also called "Base Slot" may thus be interrogated by the micro-program. The assigned address corresponds to one of the 16 command slots transmitted per frame over the loop.

SD-7 "REQUEST" Source

The "REQUEST" source is a multiplex in line from the I/O interface. This line is used by the Device to signal that it has information ready to be sent. The micro-program tests this line at appropriate times and if a signal is present, initiates an Input Operation.

SD-8 "DISABLE TLA" Source

The "DISABLE TLA" source is an external line. External lines are identified by an asterisk (*) in FIGS. 2 and 3B. These lines bring in signals from sources external to the TLA. A minus or ground level on this line can be interrogated by the micro-program at appropriate intervals and the appropriate disabling steps taken. This signal disables the apparatus from recognizing any of its own slots on the loop. All Clocks and Frame Sync functions perform normally and loop bits are passed along.

SD-11 "CARRY" Source

The "CARRY" latch is also a valid destination and can be set or reset prior to addition or used for temporary storage in addition to holding the carry resulting from a preceding ADD operation.

SD-13 "SEL S/R" Source

The "SEL S/R" is a 4 stage shift register. Upon completion of an I/O Input Operation, this register will contain the address of the I/O device which has been polled. The microprogram has access to the high order bit and the register is shifted toward the high order each time it is used as a Source in an Op execution. The micro-program therefore has access to the entire address, one bit at a time. The address is required, for example, in the generation of an ATTENTION command which requests attention from the controlling module.

The SEL S/R is also a valid Destination as described in Section 5.5. Briefly, it is used as a Destination to assemble the device address for transmission over the I/O Interface in an I/O Output Operation.

SD-14 "DATA IN" Source

The "DATA IN" source is a multiplex in line from the Device. The nine bits of data appear on this line one after the other during Frame time starting with the rise of Request Response during an Input Operation. The rise of Request Response also terminates the Wait for Read State and thereby reinstitutes instruction execution. The microcode sequence LDA, STA, LDA, STA etc. for nine consecutive instruction pairs could be used to move this incoming data into the RAM for later analysis.

SD-15 "PASS MODE I/O" Source

The "PASS MODE I/O" source is strapped to ground if pass mode is to be used. In addition to its use as a "source" for the micro-code, this input also enables the hardware set signal to the PASS MODE Latch which is generated when an unattached device is selected for an I/O Output Operation.

5.5 Latch Destinations

SD-0 (Not Used)
SD-1 "IND S/R" Destination

The "IND S/R" destination is a 4 stage shift register whose bits 1, 2, 3 and 4 cause corresponding external indicators IND 1, IND 2, IND 3 and IND 4 to light. Bit number 1 may be loaded, set or reset by one of the three "Destination" instructions. When this happens the register is also shifted so that the old contents of position 1 is moved to position 2 and so on with the old contents of position 4 being lost. In general, a series of 4 destination ops are used to re-load the contents of the IND S/R.

SD-2 "FRAME SYNC" Destination

The microcode sets the FRAME SYNC Latch after it has recognized one or more of the distinctive "frame" patterns of bits passing down the loop and has synchronized the program with these patterns. It Resets the FRAME SYNC Latch whenever this frame synchronization is lost.

The FRAME SYNC Latch is also a valid source and may be interrogated by the micro-program to determine the current status of frame synchronization.

SD-3 "PROG RESET" Destination

The "PROG RESET" Latch is set by the micro-program in response to a Reset Command and reset by the micro-program after approximately one loop interface bit time. The latch while ON, raises the I/O interface multiplex out RESET TTL line. This signal in turn resets all devices attached to the interface. The PROG RESET Latch resets the following registers and latches:

Ind S/R
Sel S/R
Data Out S/R
Frame Sync Latch
Suppress Latch
WAit for Read Latch
Dor Full Latch I/O Interface Controls and Associated Latches SD-4 "DOR FULL" Destination The "DOR FULL" Latch is set ON by the micro-program to initiate an Output Operation to a device. The Set operation is executed after the device address has been loaded into the SEL S/R and the device Command or Data has been loaded into the DATA OUT S/R. The DOR FULL Latch, initiates the Output Operation and the Output Control Logic completes the sequence which transfers the contents of the DATA OUT S/R serially over the interface to the selected device. Following transfer of the 9th bit the DOR FULL Latch is automatically reset, as is the Output Control logic.

The DOR FULL Latch is also a valid Source and may be interrogated by the micro-program to detect completion of the Output Operation.

SD-5 "PASS MODE" Destination

The "PASS MODE" Latch can be Set or Reset by the microprogram as required to enter and leave Pass Mode. It can also be Set by control logic in the event that an attempt is made to transfer a device command to an unattached device. This, latter Set input is effective only if the PASS MODE I/O signal is present as an input. This signal is provided at the time of installation by placing a ground strap on the Pass Mode I/O input.

The purpose of Pass Mode is to facilitate Slot Sharing which allows multiple users (a slot group) to share the same slot address. A user in Pass Mode transmits the loop bits without alteration. A new command Leave Pass Mode and an extension of the Attention Command operation are required to control the pass mode.

SD-6 "SUPPRESS" Destination

The "SUPPRESS" Latch can be Set and Reset by the microprogram as required to suppress I/O device activity. The SUPPRESS Latch raises the multiplex out SUPPRESS line to the I/O devices. Interface controls allow the suppress line to change only when the Frame line is not active. The Suppress signal prevents requests for Read and requests for attention so that commands can be sent out over the interface. It also can be used to prevent requests while in Write Echo mode and input operations cannot be handled.

The device must drop its Request line when Suppress rises. The device should also be able to accept a command when Suppress rises.

The SUPPRESS Latch will be reset and the Suppress line will fall when the Device Request can be accepted.

SD-7 (Not Used)

SD-8 "WAIT FOR READ" Destination

The "WAIT FOR READ" Latch may be Set by the microprogram to initiate an I/O Input Operation. This will be done in response to an I/O Request which means that a device is requesting Attention or is ready with Data or with Sense Information to be read. The "Set" action is taken at a point in time such that the resultant Polling and data transfer can be completed before the next loop bit send time.

WAIT FOR READ, when On, causes the microprocessor to go into the WAIT state. The ROM address of the next instruction is held in the instruction counter and that instruction is available at the ROM output ready for immediate execution following exit from the WAIT state.

WAIT FOR READ also initiates Polling by the I/O Input Operation interface controls. In polling the device addresses are sequentially presented until the requesting device's address is reached. When this occurs the device raises Request Response and drops Request. The rise of Request Response causes the responding device's address to be held in the SEL Shift Register, the Poll Counter is reset to serve as a Bit Counter and the Wait To Read Latch is reset to restart the microprocessor. The selected device sends its data sequentially over the Data In line.

The microprogram moves the incoming data into RAM by executing nine consecutive LDA, STA instructions, or their equivalent, with "DATA IN" and RAM as the respective Source and Destination.

Upon completion of the 9 bit data transfer as indicated by the Bit Counter in the I/O Interface control, the Select address is degated from the interface Select lines and the controls are reset. The address of the requesting device remains in the SEL S/R. If the request was for Attention, the microprogram reads the device address from SEL S/R and assembles an Attention Command for transmission onto the loop.

SD-9 "WAIT FOR REC" Destination

The "WAIT FOR REC" Latch provides the basic interlock between the microprogram and the loop. This latch is set when the microprogram has completed all operations associated with receipt and transmission of the last loop bit. The microprocessor is thereby placed in the Wait state and remains there until the next loop bit is received. At this time the Loop Sync Control generates an RLS pulse (receive sync line of FIG. 1) which clocks the newly received bit into the Accumulator and also into the Pre Send latch and then resets the Wait For Rec latch to restart the microprocessor. If the received bit is to be passed on down the loop, no action is needed by the microprogram. If a bit different from the one received is to be sent, the Pre Send latch must be loaded or set to the new state before the following bit send time.

SD-10 "PRESEND" Destination

The "PRESEND" Latch is used to hold the bit which will be sent next on the loop. When the time for sending this new bit is reached, the Loop Sync Control generates an RLLS pulse (send sync line of FIG. 1) which sets the contents of the Pre Send latch into the Send latch (18 of FIG. 1) which in turn drives the Send Line TTL driver.

The Presend latch is automatically loaded with the bits received on the loop. Passing bits requires no action by the microprogram. Sending new bits is accomplished by microcode load, set or reset of the Pre Send latch. The time available for this action extends from receipt of a bit at approximately midway through the loop bit time until bit send time at the start of the next loop bit time. This timing derives from the delay of approximately one loop bit time through the circuitry.

SD-11 "CARRY" Destination

The "CARRY" latch is automatically set to the CARRY result of an ADD operation. Its use as a destination is primarily to provide means for Reset or Set to an appropriate initial condition preceding addition or subtraction of two numbers. For example, the comparison of two numbers involves subtraction which requires an initial carry-in. The Carry latch, being a valid source, is also a handy location to store temporary Flags provided the ADD operation is not being used.

SD-12 "DATA OUT S/R" Destination

The nine stage "DATA OUT S/R" is loaded by the microprogram in preparation for an I/O Output Operation. The device Command or Data is placed in the DATA OUT S/R one bit at a time in the order in which the bits are to be transmitted to the device i.e. first in first out. The register shifts each time the first bit is Loaded, Set or Reset.

During the subsequent Output Operation, the contents of this shift register are gated onto the device over the DOR DATA multiplex out line. The shifting takes place for each step of the PB Counter and ceases when the count reaches 9.

SD-13 "SEL S/R" Destination

The four stage "SEL S/R" is loaded by the microprogram in preparation for an I/O Output Operation. The Device Address is placed in the SEL S/R one bit at a time in descending order of address weights. The register shifts each time the first bit is Loaded, Set or Reset.

During the subsequent Output Operation, the contents of this register are gated out broadside to the Sel 1, 2, 4, 8 multiplex out lines.

SD-14 and SD-15 (Not Used)

VI. DATA FLOW

The organization of the TLA is described in detail in the following subsections with reference to detailed logic blocks in FIGS. 2 through 12.

6.1 Source/Destination Decode

This logic (block 48, FIG. 2) decodes ROM bits 6–11 into 26 individual lines for use in gating both sources and destinations.

6.2 Bus In

Figure 2:
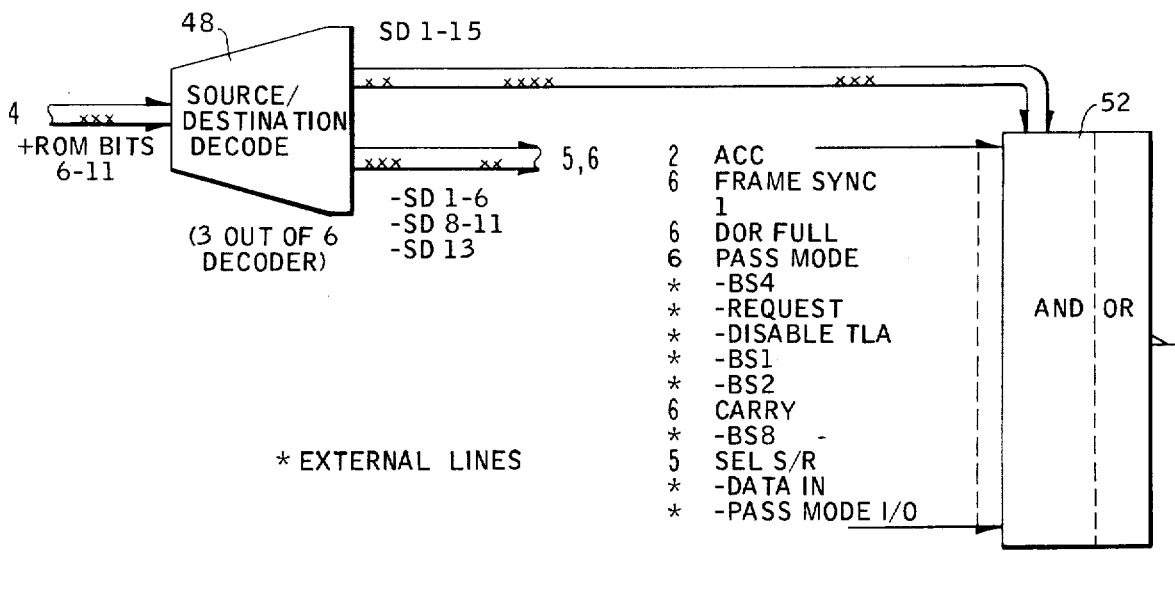
FIG. 2 is a detailed logic diagram of the source/destination decoder, the source lines, the arithmetic logic unit (ALU) and the accumulator latch.
Figure 2:
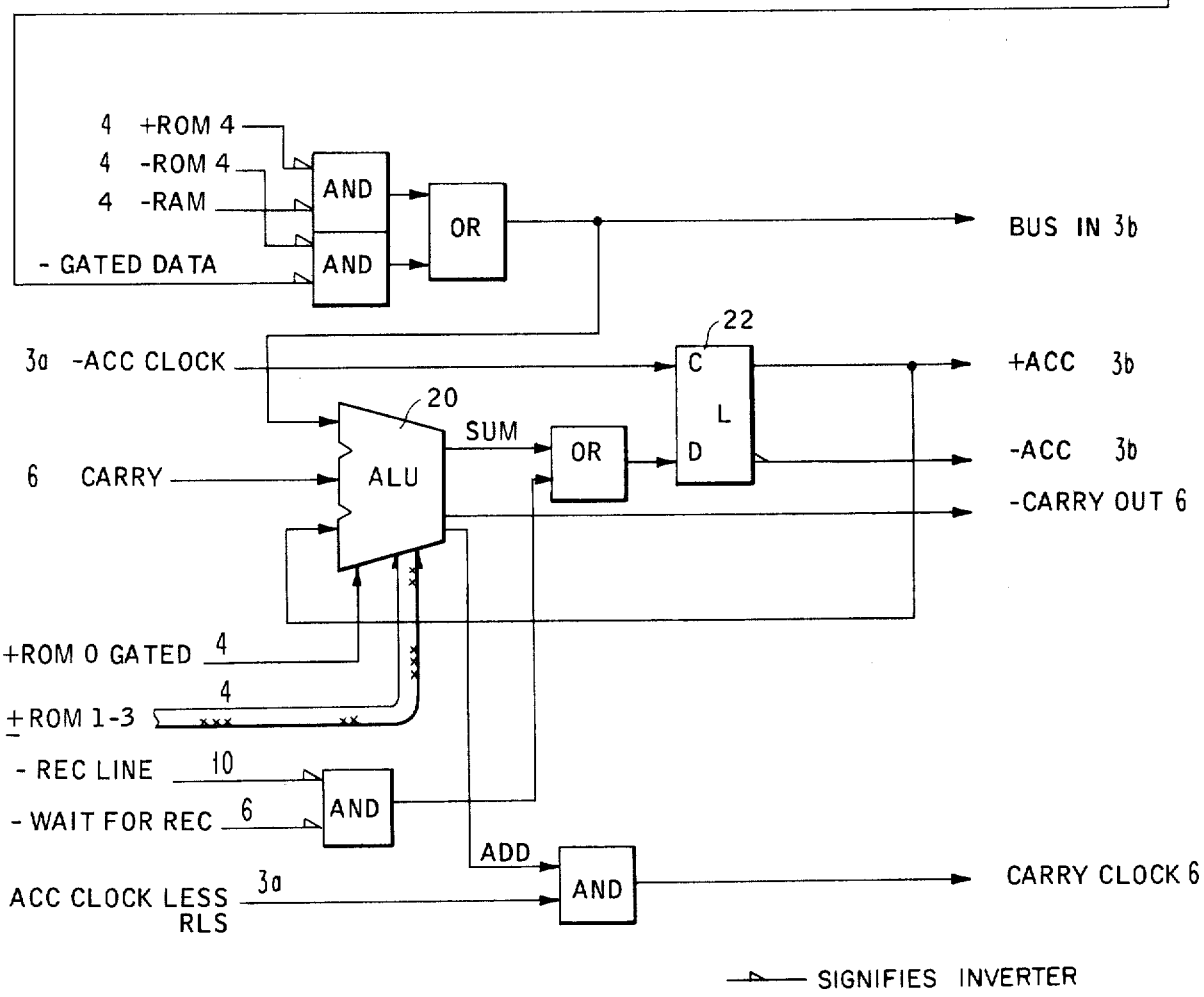

Logic 52, FIG. 2, gates the various sources onto a common line called — Gated Data. A Bus In line is created by the selective gating of -Gated Data from the Bus In logic or of -RAM from the Random Access Memory. The choice is determined by ROM Bit 4 which is 0 for RAM sources and 1 for Latch or I/O sources.

6.3 Op Code Decode, ALU and Branch

Bus In along with the ACC and CARRY lines are the data inputs to the ALU 20. The Op Code bits ROM 0-4 selectively gate the appropriate ALU output via large OR circuit (not shown) to the data input of the ACC D-Latch and via the "CARRY OUT" line to the data input of the Carry latch, shown in FIG. 6. This logic serves all of the source ops. During WAIT FOR REC the REC LINE is presented to the ACC data input. It will be clocked in by the RLS pulse from the loop sync control (FIG. 10) at bit receive time.

Dual polarity Bus Out lines are created by the selective gating of the ACC line for the STA operation, the Bus-In line for LDP or LDO operations, and of the ROM 3 line for SET or RST operations. ROM 3 is 1 for SET operations and 0 for RST operations.

A Branch Flip Flop (BRFF) 54 is set by conditional branch operations. It stays set for one cycle and identifies the subsequent cycle as a Branch Address ROM fetch and serves the purpose of preventing the address from being acted upon as an instruction.

Additional logic is provided for gating the "clock A" pulse with various conditions before it reaches the clock inputs of the various latches and shift registers that it drives.

6.4 Bus Out S/R's

Figure 5:
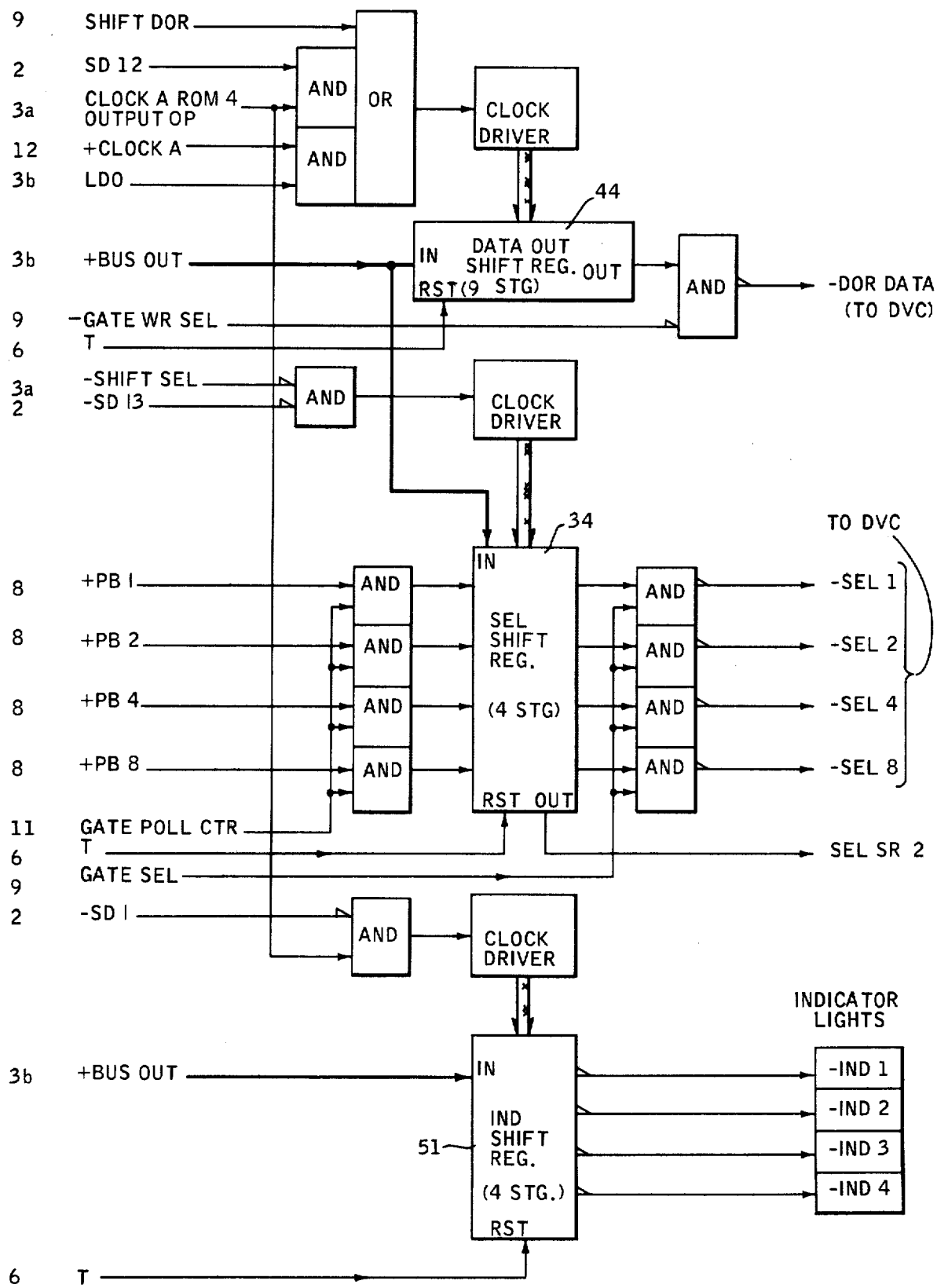
FIG. 5 is a detailed logic diagram of the data out, select and indicator shift registers.

FIG. 5 shows the 9 Stage Data Out S/R 44 used for assembling commands or data for transmission to a device over the I/O Interface in a subsequent Output Operation. Also shown is the 4 Stage Sel S/R 34 used for assembling the device address for transmission over the I/O Interface Select lines during a subsequent Output Operation. This register is also used to capture the device address upon completion of polling and hold it accessible to the microprogram at the conclusion of an Input Operation.

6.5 Bus Out Latches

Figures 3, 3A:
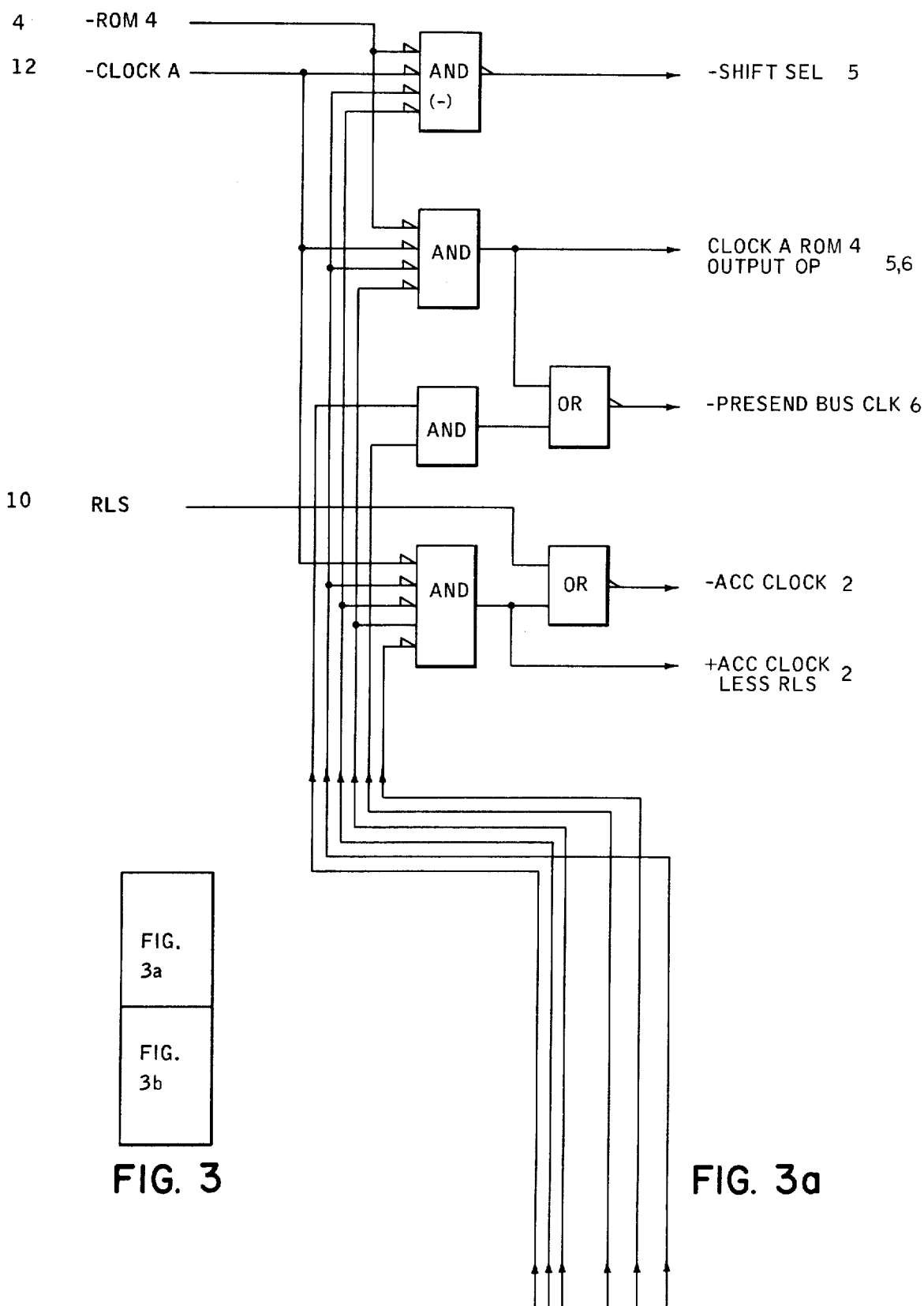
FIG. 3 is a diagram showing how
FIGS. 3a and 3b are combined.
Figure 3B:
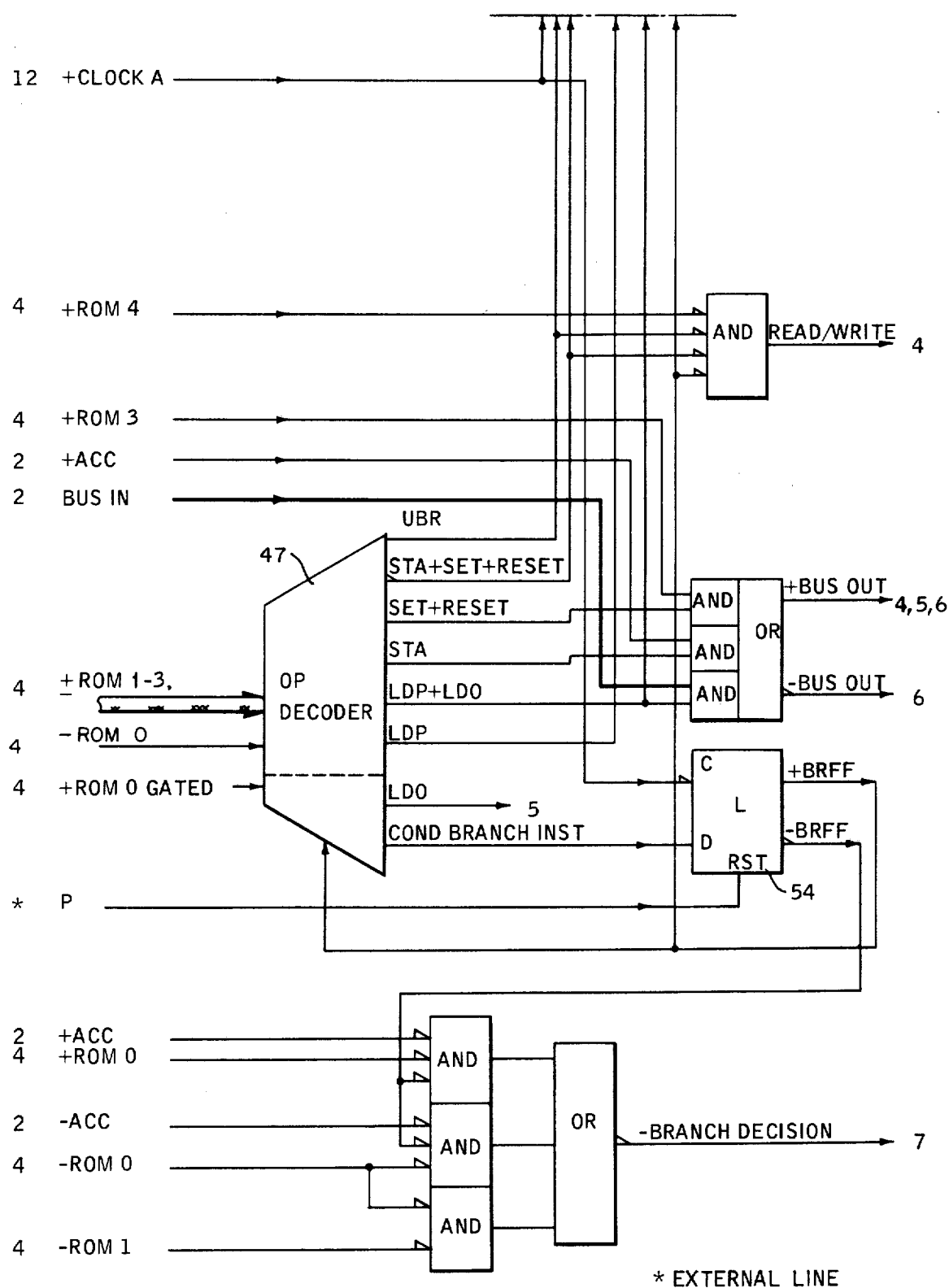

The clock line for the Bus Out Latches (FIG. 6) and for the IND S/R (51, FIG. 5) consists of clock A timing gated by ROM bit 4, Output Op and not BRFF (FIG. 3a). It is present only for a STA, SET or RST op with a latch destination and a ROM output which represents a valid op. (Not a Branch Address). This clock signal, coincident with a destination (SD) signal, causes the state of Bus Out to be loaded into the corresponding Bus Out latch or into the first stage of the IND S/R. In the case of IND S/R the register contents are simultaneously shifted with the previous high numbered bit being lost.

The four bits in the IND S/R cause correspondingly numbered external Indicators to light.

Figure 6:
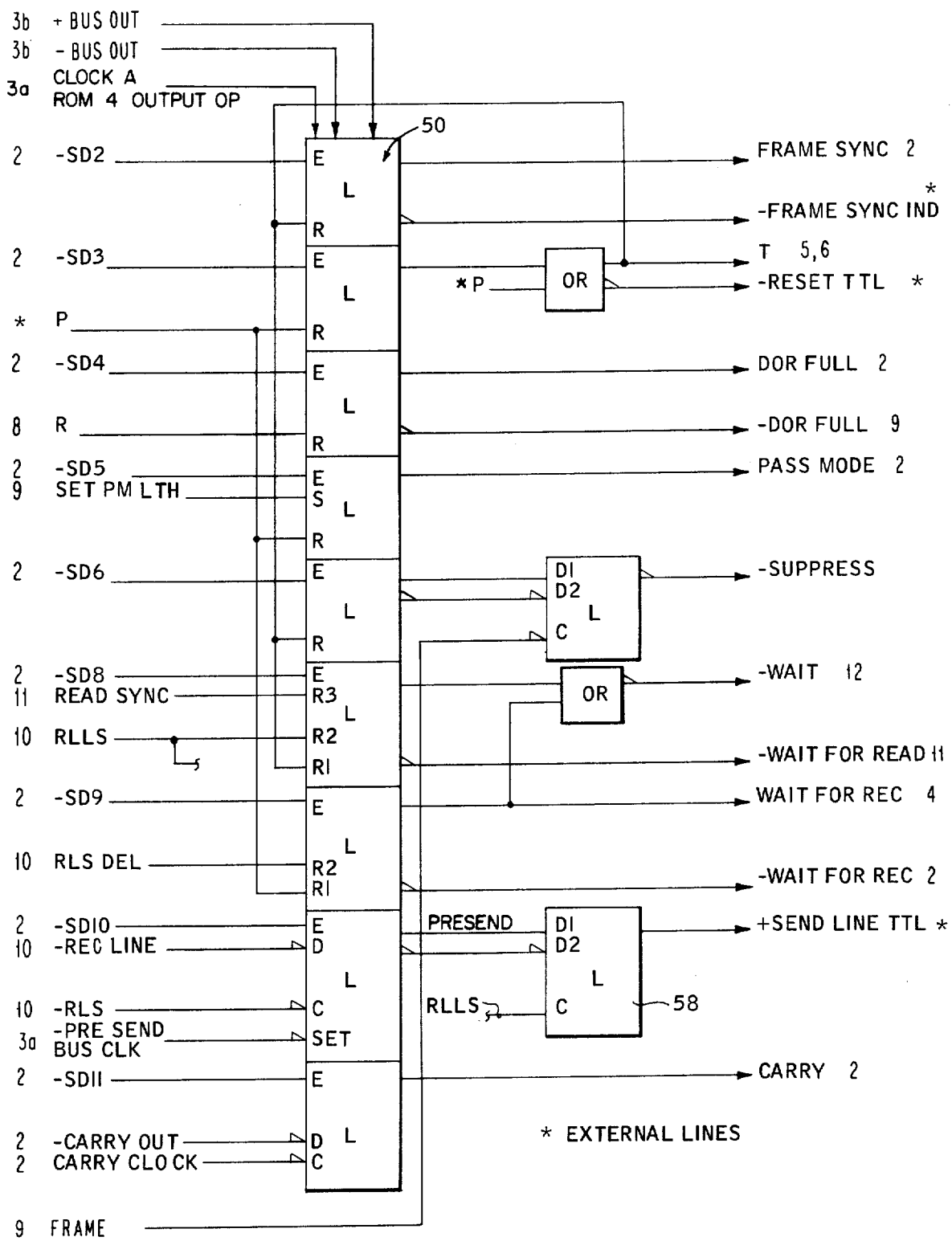
FIG. 6 is a detailed block diagram of the destination latches.

The group of latches 50 shown in FIG. 6 are described below.

The *Frame Sync latch* is set by the microprogram when Frame Sync is achieved and reset when Frame Sync is lost.

The *Prog Reset latch* is set by the microprogram in response to a Reset Command and reset approximately one loop bit time later. The latch raises the I/O interface multiplex-out Reset line to reset the I/O devices. It also raises the internal reset T lines to reset the I/O Interface control logic.

The *Dor Full latch* is set by the microprogram to initiate and I/O Output Operation. It is reset by control logic when the Output Operation has been completed.

The *Pass Mode latch* is set or reset by the microprogram and is also set by control logic. The hardware set is effective only if the Pass Mode I/O line is tied to ground. It occurs when a Command is transferred to an unattached device. This latch is interrogated by the microprogram to determine whether or not the TLA is in Pass Mode.

The *Suppress latch* is set or reset by the microprogram as required to suppress requests from the devices. The Suppress Gated latch copies the contents of the Suppress latch between Frame intervals and when On, raises the I/O interface multiplex out Suppress line.

*The Wait for Read latch* is set by the microprogram to initiate an I/O input Operation. It puts the microprocessor into a Wait state until it is reset at the end of polling at which time the microprogram must read the incoming data. If, because of a failure of some kind, the Wait for Read latch is not reset by an end of polling signal, it will then be reset by RLLS (FIG. 10) at the next loop send time. This prevents the TLA from locking up.

The *Wait for Receive latch* is set by the microprogram when it is ready to receive the next loop bit. It puts the microprocessor into a Wait state until it is reset by the RLS pulse at loop bit receive time. The WAIT line is raised by either Wait for Read or Wait for receive. The WAIT line inhibits the RESTORE input to ROS and the WAIT SYNC latch (56 (FIG. 12) at the end of the current instruction cycle and thereby inhibits Clock A to produce the Wait condition.

The *Pre Send latch* is automatically loaded with the received loop bits at RLS time. It may subsequently be changed by the microprogram if the slot is being used by the TLA. At bit send, (RLLS) time, the contents of Pre Send are copied into the Send Latch and transmitted to the loop via Send Line TTL.

The *Carry latch* is automatically loaded with the carry result of ADD operation. It can also be changed by the microprogram.

6.6 Latch Timing & Clock A

The Clock A pulse (FIG. 12) is generated by the down state of -RCA and -RCB. It is used to gate results of the current instruction cycle into the internal TLA latches and shift registers.

Figure 4:
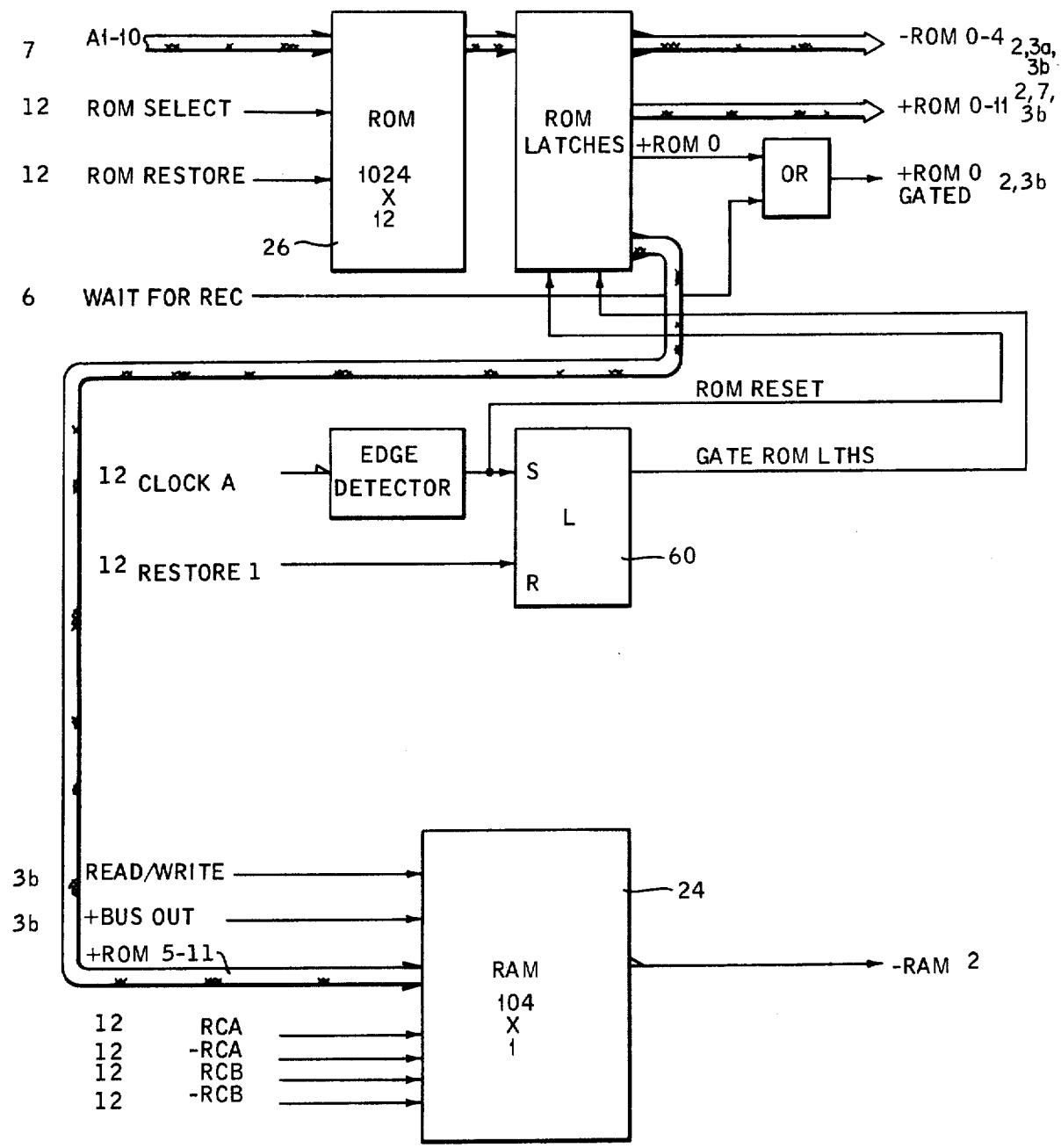
FIG. 4 is a logic diagram of the Random Access Memory (RAM) and Read Only Memory (ROM)

The ROM RESET (also referred to as Clock B) pulse is generated by the falling edge of clock A, FIG. 4. It is used to reset the ROM output latches and to set a S/R latch 60 which gates results of the current ROM fetch into the ROM output latches. The S/R latch 60 is reset approximately 400 nsec. later by the RESTORE 1 timing signal.

6.7 Instruction Counter

Figure 7:
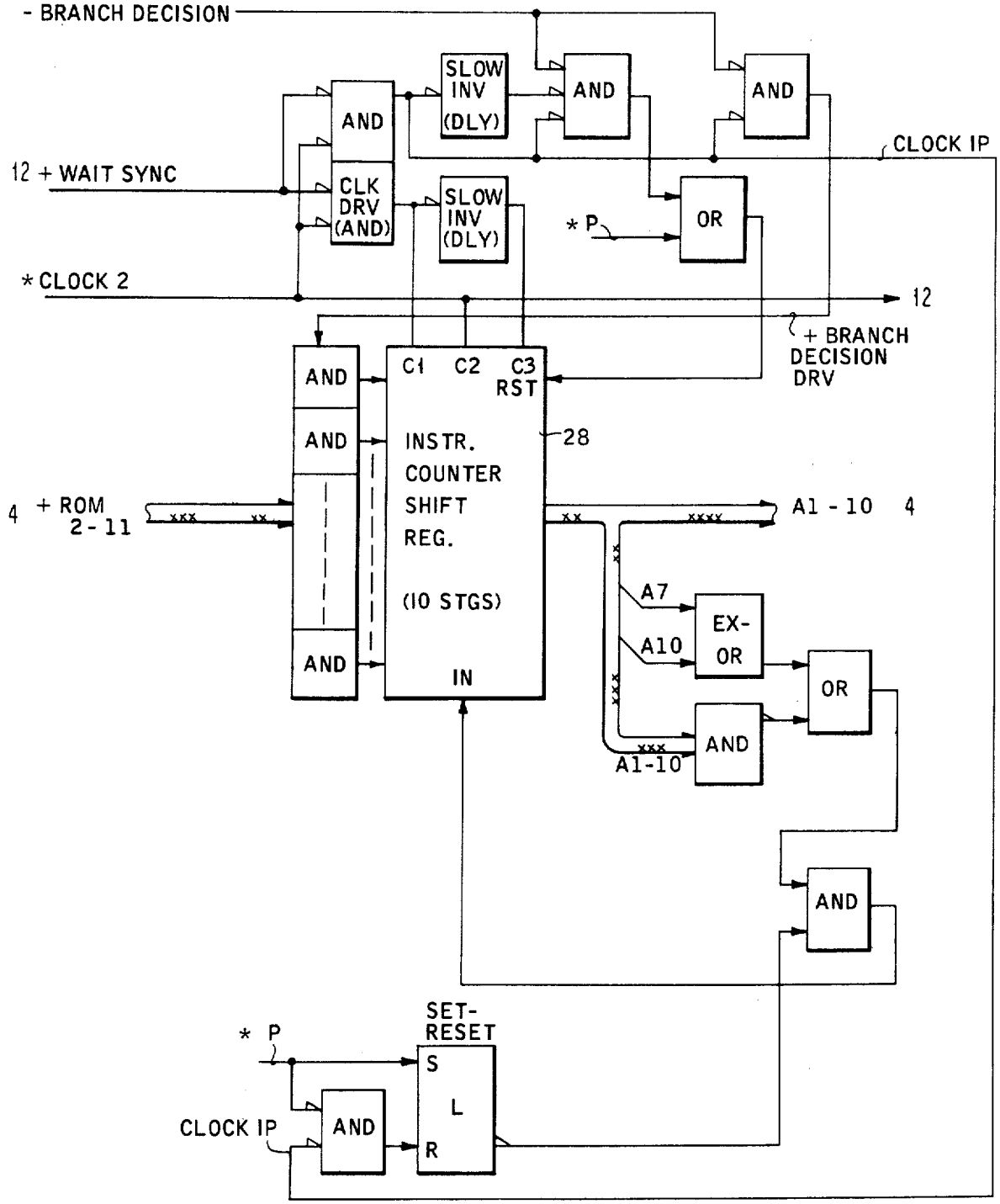
FIG. 7 is a detailed block diagram of the instruction counter.

The instruction counter 28, FIG. 7, is a maximal length feedback shift register. The feedback equation is the modulo 2 sum of the bits A7 and A10 in positions 0 and 3 ORed with the AND of all positions to step it out of the all zeros state. The counter sequences through 1024 states but not in the usual numeric order. The instructions in ROM are placed in a corresponding sequence of locations. It is permissible to branch to location zero but if the instruction counter is allowed to wrap around it will skip location zero.

6.8 Poll/Bit Counter

The Poll/Bit Counter 32, (FIG. 8) is a 4 bit binary D latch counter. It is used to generate a sequence of device addresses during Polling and to count the number of bits transferred across the I/O interface during Input and Output operations.

6.9 Loop Sync Control

Figure 10:
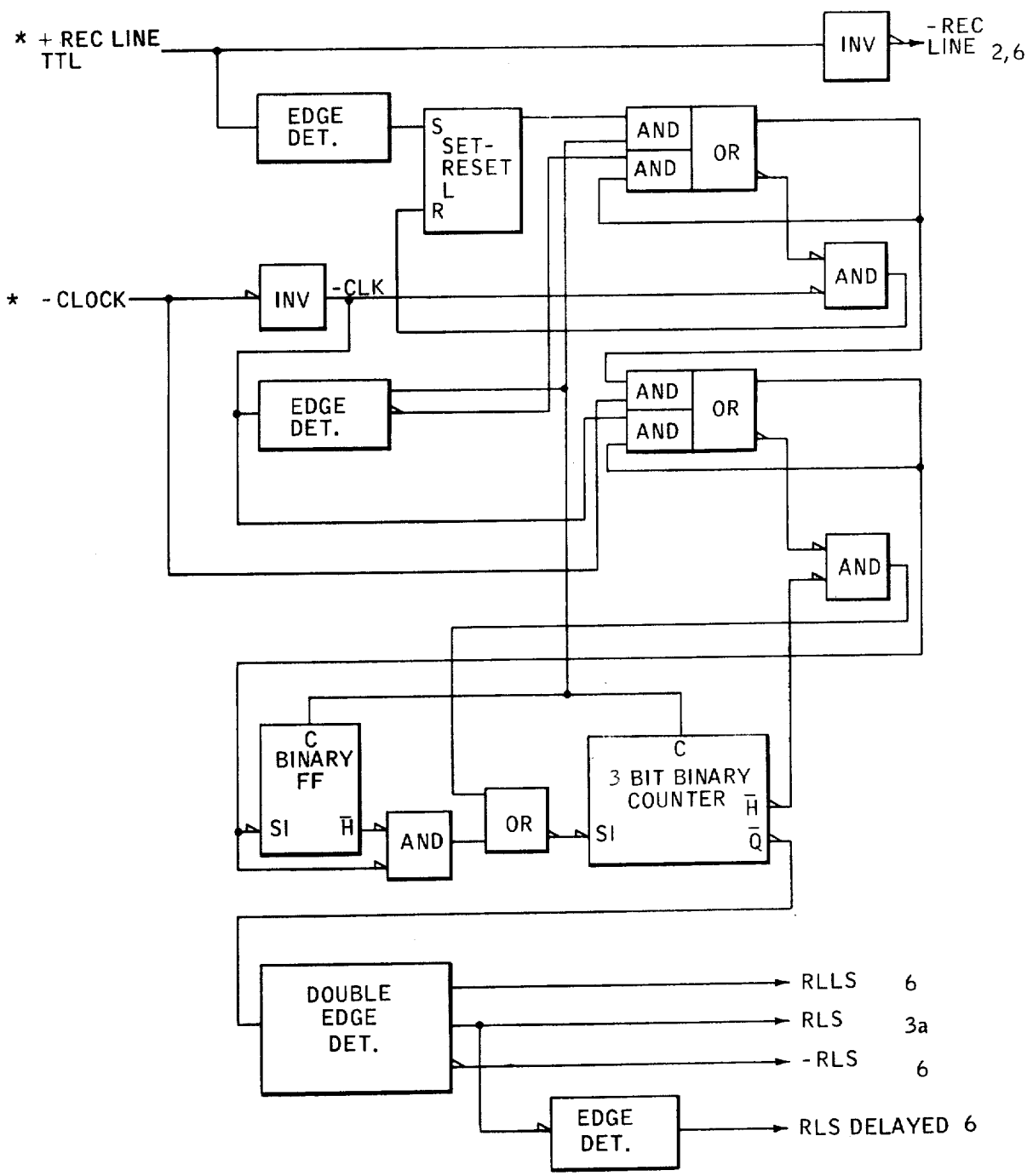
FIG. 10 is a detailed block diagram of the loop sync control.

The Loop Sync Control, FIG. 10, synchronizes the TLA with the loop. The Clock input, derived from an external oscillator, is chosen to be very close to 16 times the loop bit rate. This clock operates a 4 bit binary D latch counter which therefore advances 16 counts per bit time. When the count wraps around from 15 to 0 an RLLS pulse is generated to signify loop send time. When the count advances from 7 to 8 on RLS pulse is generated signifying loop receive time. To keep the counter in correct phase relative to the loop, all rising edges on the Rec Line TTL ae synchronized with the current counting phase and if the count is in the range 8 to 15 the next increment is by 2 instead of by 1. If the count is in the range 0 to 7 the next increment is skipped. This keeps the count at 0 or 15 at the leading edge of loop bit time. Sampling takes place in the middle of bit time and sending takes place at the end of bit time. There is one bit time of delay through the TLA. The loop receive time is always 7 or more counts before send time. This guarantees 7/16 of bit time for microprocessor operation from RLS time to RLLS time.

6.10 I/O Interface Logic (Output Operation)

Figure 8:
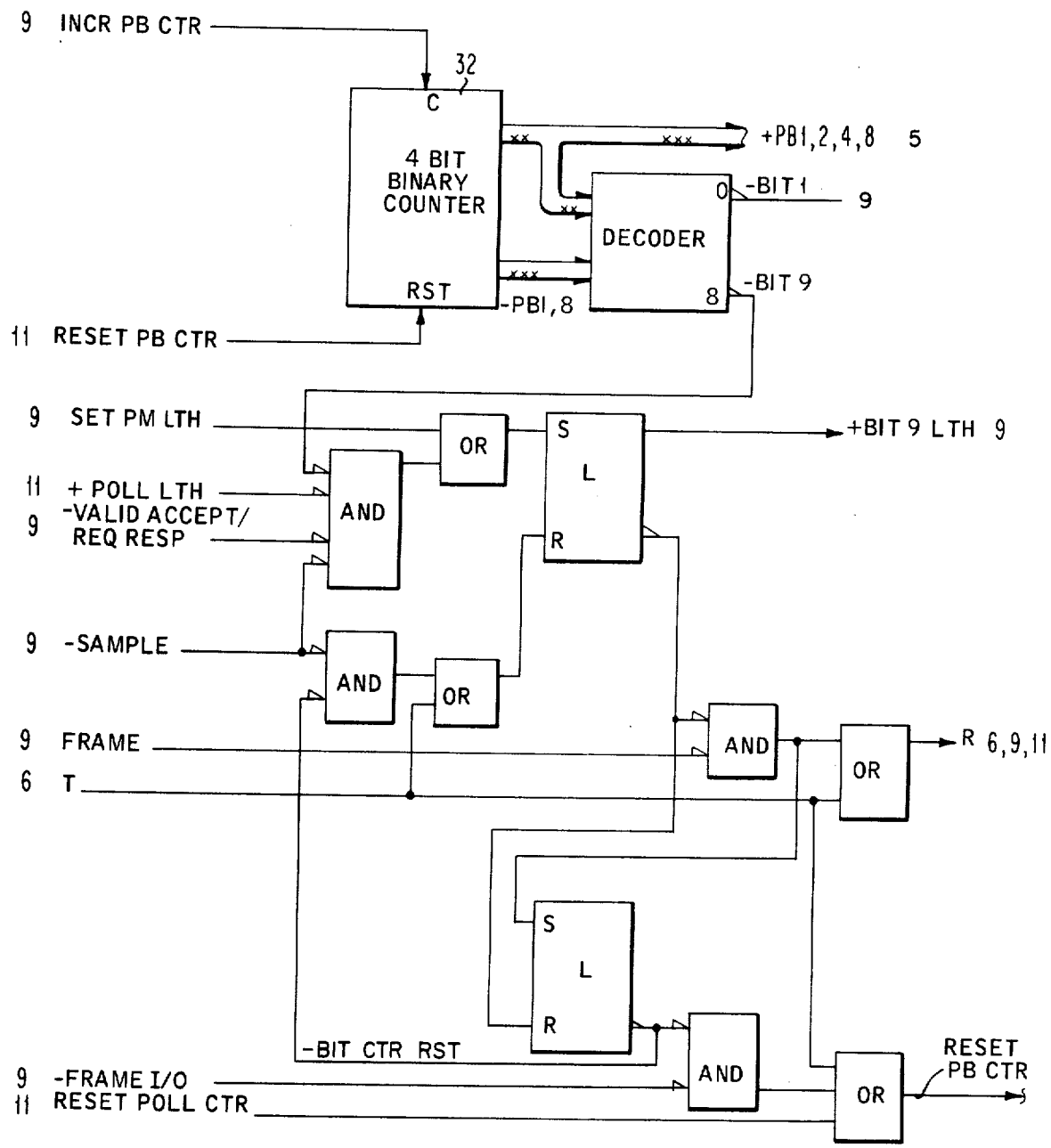
FIG. 8 is a detailed block diagram of the poll bit counter and the I/O interface logic.
Figure 9:
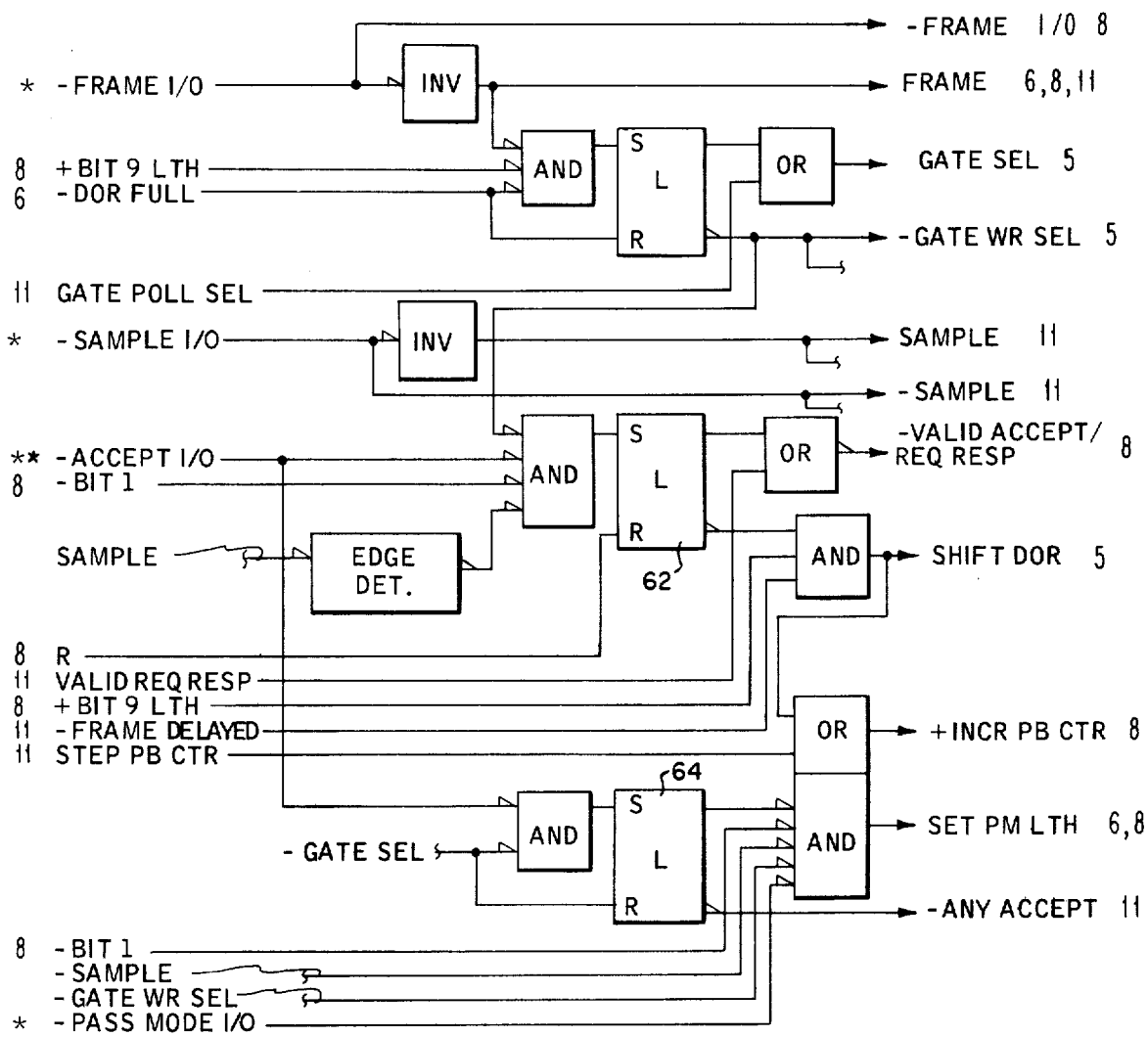
FIG. 9 is a detailed block diagram of the I/O interface control logic.

The I/O Interface logic (Output Operation) of FIGS. 8 and 9 is initiated when the microprogram sets the DOR FULL latch (FIG. 6). This is done after the microprogram has loaded the device address into SEL S/R and the Command or Data into DATA OUT S/R. The controls in FIG. 9, upon receiving the accept signal from the device, turn on valid accept latch 62 and any accept latch 64 and transmit the contents of DATA OUT S/R serially to the device. When the ninth bit has been sent, the interface controls including the DOR FULL latch are reset. Gate WR SEL is set by DOR FULL being on and is reset by DOR FULL being off. Gate WR SEL is used as shown in FIG. 5 to gate data from DATA OUT SHIFT REG 44.

A busy device will respond to its Select address by returning a short accept uplse which turns on any accept latch 64. The controls recognize this signal and wait for a full accept or until the microprogram rests DOR FULL.

If a Command is sent to an unattached device, no accept will be received. The interface controls in this case, test the Pass Mode I/O (an external line) and if it is in the down state, sets the Pass Mode latch (FIG. 6) and resets the interfacc conrols including the DOR FULL latch (FIG. 6). If the Pass Mode I/O line is not in the down state (not strapped to ground) the interface controls will not change until DOR FULL is reset by the microprogram or until a Program Reset is executed.

6.11 I/O Interface Logic (Input Operation)

Figure 11:
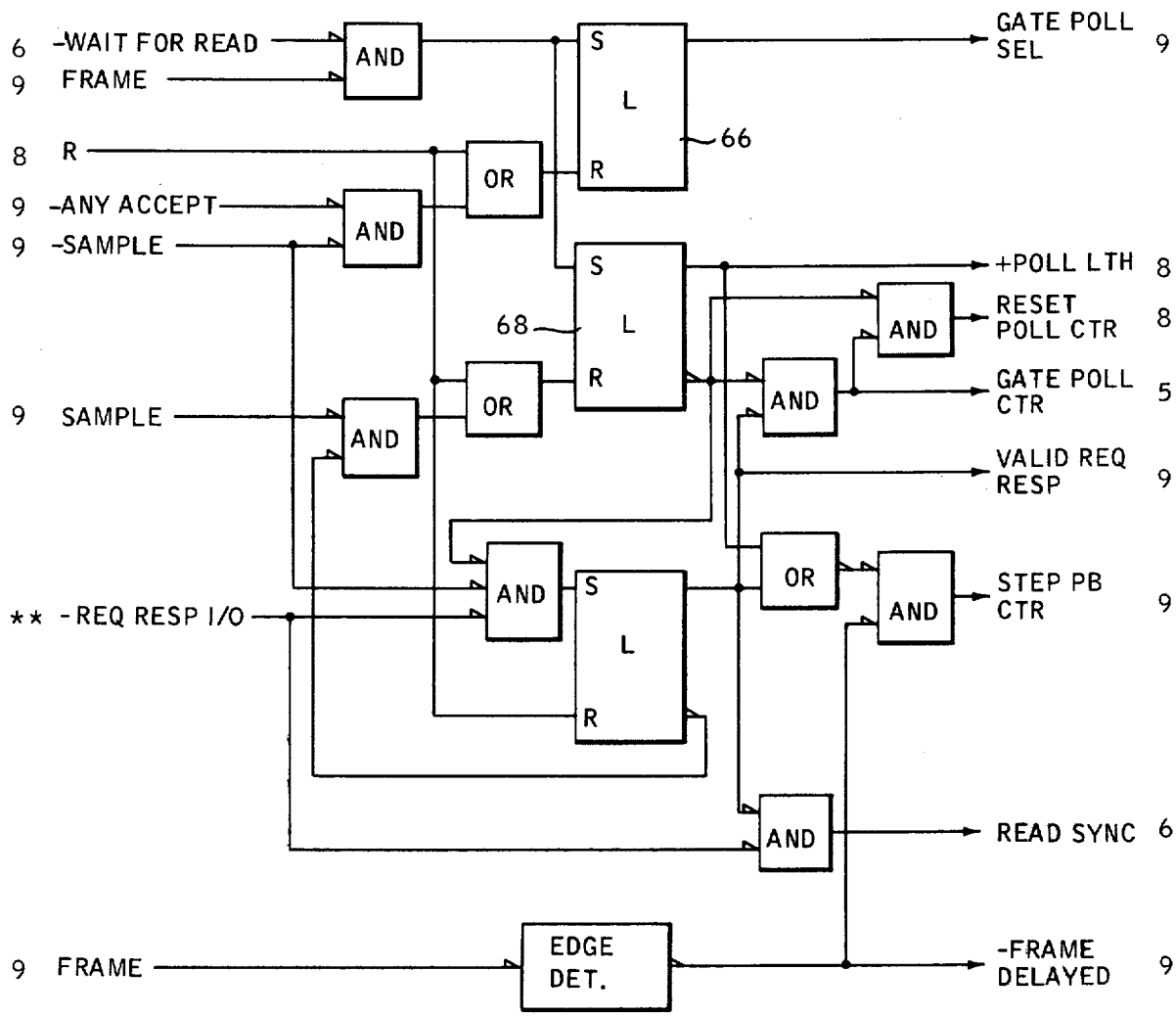
FIG. 11 is a detailed block diagram of the I/O interface control logic.
Figure 12:
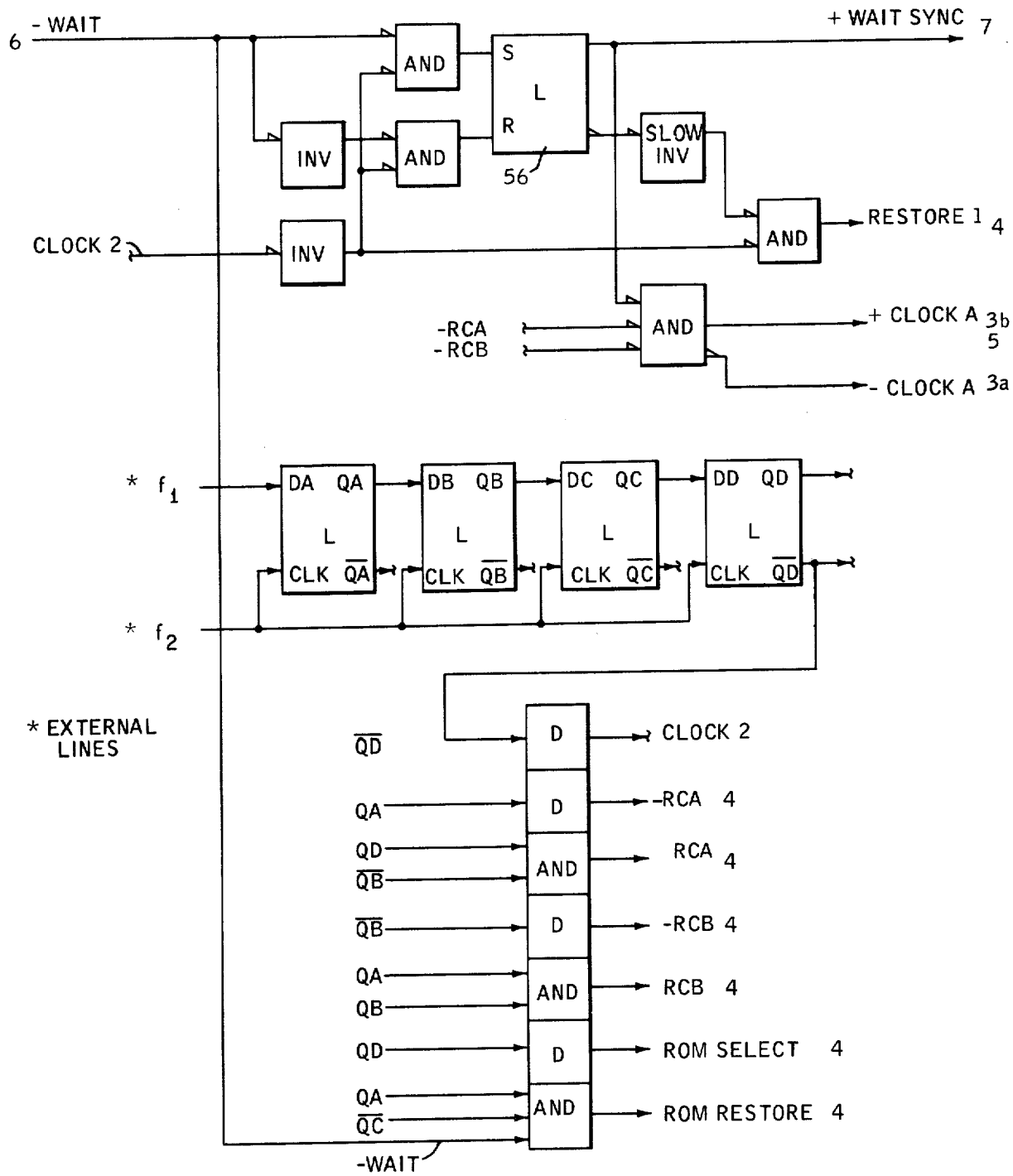
FIG. 12 is a detailed block diagram of the wait sync latch and the clock driver logic.

The I/O Interface Logic (Input Operation) of FIG. 11 is initiated when the microprogram sets the WAIT FOR READ latch (FIG. 6). This is done by a set instruction after a device has raised the Request line to indicate that it needs attention or is ready with Sense information or Data. The Wait for Read latch turns on the Gate Poll Sel. latch 66, and Poll latch 68. The interface control Polls the devices by connecting the output of the Poll/Bit counter (FIG. 8) to the interface Select lines (FIG. 5) and then advancing the counter successively through the sequence of device addresses starting with address 1. This sequence continues until the Requesting device recognizes its address and raises Request Response (FIG. 11). When this occurs, the responding devices address is held in the SEL S/R, the Poll/Bit Counter is reset to serve as a bit counter and the WAIT FOR READ latch is reset to restart the microprocessor.

At this point in the sequence the device sends its command or data across the interface at the rate of one bit per frame. The microprogram moves the data into RAM by a series of nine LDA, STA operations, or their equivalent.

The interface controls count the Frames corresponding to the data bits and after nine bit times cause the interface controls to be reset.

6.12 RAM

The Random Access Memory 24 (FIG. 4) is a 104 × 1 array available to the microprogram for the storage of machine state, commands in process, modulus assigned, data in transit, miscellaneous flags, etc. as required. The memory is addressable as a valid source in all source ops and as a valid destination in all destination ops.

6.13 ROM

The Read Only Memory 26 (FIG. 4) is a 1024 × 12 array containing the microinstructions for the microprocessor. It receives its addresses from the Instruction Counter 28 (FIG. 7) and sends its output bits to the Op Decoder, the Source/Destination Decoder, to the RAM address inputs and to the Instruction Counter, for Branch Addresses.

6.14 Wait Sync

The purpose of Wait Sync 56 (FIG. 12) is to synchronize entry into and exit from the WAIT state with the beginning of an instruction cycle. Entry into Wait is initiated when either the Wait for Rec or Wait for Read latch is set. This happens in the latter half of an instruction cycle while Clock 2 is down. When Clock 2 rises at the start of the next cycle the Wait Sync latch is set. This holds the Instruction Counter at its current value and inhibits Clock A to place the TLA in a Wait state. A delayed output from the Wait Sync latch allows a shortened version of the normal Restore 1 signal so that the Gate ROM Lths signal will drop at its normal time and thereby latch the ROM output during Wait.

Exit from Wait is initiated by the reset of the Wait for Rec or Wait for Read latch. This also happens in the latter half of an instruction cycle while Clock 2 is down. When Clock 2 rises, the Wait Sync latch is reset. This in turn allows the instruction counter to advance and enables Clock A so that the microprocessor will resume operation.

6.15 Clock Logic

The Clock logic (FIG. 12) provides the clocking signals required for RAM, ROM and IC. The clock signal $f_1$ is fed through a chain of four D latches which are clocked in parallel by the higher frequency $f_2$. The outputs from the successive latch stages are four copies of the $f_1$ waveform each delayed in time from the previous output. The corresponding signal lines are labeled QA, QB, QC, QD. Their inverses are also available. A driver circuit driven by not QD generates CLOCK 2 which provides the basic TLA Instruction Counter timing signal. RAM clocks RCA, and -RCB are generated by driver circuits driven by not QA and not QB respectively. RAM clock -RCA is derived from the AND of QD and not QB. RAM clock RCB is derived from the AND of QA and QB -ROM SELECT is generated by a driver circuit driven by QD. ROM RESTORE is derived from the AND of QA, not QC and not WAIT. The WAIT signal is driven by the TLA output signal -WAIT. ROM RESTORE is held down during Wait.

Also required but not shown are four non-inverting drivers for the I/O interface Select signals.

VII. MICRO-PROGRAMMING

7.1 General

The Terminal Loop Adapter (TLA) transfers information between the loop and the several attached devices. The microprogram, in conjunction with the hardware, is capable of performing a variety of functions, including receiving and storing incoming loop data; decoding, checking, and executing valid loop commands; sending data and commands to a device; and accepting data and service requests from a device for transmission onto the loop.

To facilitate these operations, various registers, counters, mode and status latches are required. To the extent that such elements do not already exist in hardware, the bits in the RAM are allocated to such purposes.

In normal operation, each loop bit is received by executing the instruction, SET WAIT FOR RECEIVE (Section 5.5). This instruction turns on the Wait for Receive latch, FIG. 6, which puts the microprocessor in the Wait state. When the next bit arrives, a pulse RLS DELAYED is generated by the loop sync control (FIG. 10) which resets the latch and causes instruction processing to resume with the loop bit to be found in the accumulator. The accumulator contents, after receiving the loop bit, may thus have been altered from its value at the time immediately preceding the SET WAIT FOR RECEIVE.

Only a limited number of cycles are available after the receipt of a loop bit before the PRESEND Latch must be loaded if the outgoing bit is to be modified from that which was received. (The amount of time depends, of course, upon the loop bit rate.)

7.2 Program Segments

Representative segments of microcode, which are used to carry out the functions listed above, are given in the tables in Section 7.3. Familiarity with the operation of the TLA instructions, described in Section 5.1, is assumed.

In what follows, the notation, " . . . " represents any number of intervening instructions but not including SET WAIT FOR RECEIVE and such that the maximum time interval between SET WAIT FOR RECEIVE instructions and between receive and send is not exceeded.

The first group of microcode segments relates to the loop interface. Table 1a (Section 7.3) shows how two successive loop bits are received and stored in RAM at locations RAM1 and RAM2, respectively.

Table 1b shows how two successive loop bits in RAM locations RAM1 and RAM2 are sent onto the loop.

The function of inverting and transmitting a received bit is shown in Table 1c. The bit is saved before the accumulator is inverted. "ZERO" is the source of a zero bit.

The next group of microcode segments are those which are used to interface between the TLA and the devices. Table 2a shows how data is sent to a device from RAM (RAM1 through RAM8, respectively). The device address is first shifted into the SELECT REGISTER from locations ADDR1, . . . , ADDR4. For illustrative purposes, let it also be required that the first bit of the DOR to be sent to the device is a zero. Data is next shifted into the DATA OUT REGISTER from locations RAM1, . . . , RAM8. Finally the DORFULL Latch is set.

Table 2b illustrates how transferring data from a device is performed. The setting of the WAIT FOR READ Latch puts the microprocessor into Wait state and the hardware begins polling the various devices, as described in Section IX. When processing resumes, it is expected that the first bit of the device data is on the DATA IN Line and that each bit will remain on the line for exactly two machine cycles. On completion of this operation, the SELECT REGISTER contains the address of the transmitting device.

A third group of microcode segments are those which are used to perform various internal TLA functions. Table 3a shows how a string of RAM bits RAM1, . . . , RAM4 are tested for the occurrence of a specific bit pattern 1001. At the end of the segment the accumulator is set if the RAM pattern matched the desired pattern.

Table 3b shows how two 2-bit fields (RAM bits A1, A2 and B1, B2) are compared. A branch to address NOCOMPARE is assumed to be required if the two fields do not compare.

Table 3c illustrates the decoding of a two bit field (RAM bits A1, A2). For illustrative purposes, assume that control is subsequently to be returned to a common address, "END." The values 00, 01, 10, and 11 represent ROM addresses.

Table 3d shows how a two bit counter (RAM bits C0, C1, where C0 is the most significant bit) is incremented. ONE is a source of a one bit, ZERO is a source of a zero bit. (In practice, a larger number of counter bits would normally be used.)

7.3 Tables

Table 1a. RECEIVING AND STORING TWO SUCCESSIVE LOOP BITS IN RAM

| Op Code | Source/ Destination | Comments |
|---|---|---|
| ... | | |
| set | waitrcv | wait for loop bit |
| sta | ram1 | store in ram1 |
| ... | | |
| set | waitrcv | wait for next loop bit |
| sta | ram2 | store in ram2 |
| ... | | |

Table 1b. SENDING TWO SUCCESSIVE LOOP BITS FROM RAM

| Op Code | Source/ Destination | Comments |
|---|---|---|
| ... | | |
| set | waitrcv | wait for loop bit |
| ldp | ram1 | load presend latch from ram1 |
| ... | | |
| set | waitrcv | wait for next loop bit |
| ldp | ram2 | load presend latch from ram2 |
| ... | | |

Table 1c. INVERTING AND TRANSMITTING A LOOP BIT

| Op Code | Source/ Destination | Comments |
|---|---|---|
| ... | | |
| set | waitrcv | wait for loop bit |
| sta | ram1 | save loop bit |
| oia | zero | invert accumulator |
| sta | presend | move inverted bit to presend latch |
| ... | | |

Table 2a. SENDING DATA TO A DEVICE FROM RAM

| Op Code | Source/ Destination | Comments |
|---|---|---|
| ... | | |
| lda | addr1 | load first address bit into accumulator |
| sta | selsr | shift into select register |
| lda | addr2 | load second address bit into accumulator |
| sta | selsr | shift into select register |
| lda | addr3 | |
| sta | selsr | |
| lda | addr4 | |
| sta | selsr | |
| ... | | |
| rst | dorsr | reset first dor bit |
| ldo | ram1 | shift next bit into dor |
| ldo | ram2 | |
| ldo | ram4 | |
| ldo | ram5 | |
| ldo | ram6 | |
| ldo | ram7 | |
| ldo | ram8 | shift last bit into dor |
| ... | | |
| set | dorfull | signal dor is loaded |

Table 2b. RECEIVING DATA FROM A DEVICE

| Op Code | Source/ Destination | Comments |
|---|---|---|
| ... | | |
| set | waitrd | begin polling |
| lda | datain | read first data bit |
| sta | ram1 | save in ram1 |
| lda | datain | |
| sta | ram2 | |
| lda | datain | |
| sta | ram3 | |
| (etc.) | | |
| lda | datain | |
| sta | ram9 | save last bit in ram9 |
| ... | | |

Table 3a. TESTING FOR SPECIFIC BIT PATTERN '1001'

| Op Code | Source/ Destination | Comments |
|---|---|---|
| ... | | |
| lda | ram2 | load RAM2 |
| oia | ram3 | 'OR' with RAM3 and invert accumulator |
| ana | ram1 | 'AND' result with RAM1 |
| ana | ram4 | accumulator = 1 only if RAM pattern matches |
| ... | | |

Table 3b. COMPARING TWO FIELDS

| Op Code | Source/ Dest. | Branch Addr. | Comments |
|---|---|---|---|
| ... | | | |
| lda | a1 | | |
| ebb | b1,nocompare | | branch if not equal |
| lda | a2 | | |
| ebb | b2,nocompare | | branch if not equal |
| ... | | | |

Table 3c. DECODING A TWO BIT FIELD

| Op Code | Source Destination | Comments |
|---|---|---|
| ... | | |
| lbb | a1,1x | branch if a1 = 1 |
| lbb | a2,01 | a1 was 0; branch if a2 = 1 |
| 00 ... | | a1,a2 were 0,0 |
| μ br | end | |
| 01 ... | | a1,a2 were 0,1 |
| μ br | end | |
| 1x lbb | a2,11 | a1 was 1; branch if a2 = 1 |
| 10 ... | | a1,a2 were 1,0 |
| μ br | end | |
| 11 ... | | a1,a2 were 1,1 |
| end ... | | |

Table 3d. INCREMENTING A TWO BIT COUNTER

| Op Code | Source Destination | Comments |
|---|---|---|
| ... | | |
| rst | carry | reset carry latch |
| lda | one | load one |
| add | c1 | add with carry |
| sta | c1 | save result |
| lda | zero | reset accumulator |
| add | c0 | add most significant bit with carry |
| sta | c0 | save result |
| ... | | |

7.4 Slot Sharing Example

To further illustrate the operation of the terminal loop adapter and, in particular, the microprocessor, the function of slot sharing will now be considered. Slot sharing is disclosed and claimed in the above identified co-pending Bowman et al patent application and is not claimed as our invention. Slot sharing is a feature which allows multiple TLA's (a "slot group") to share the same slot address. In what follows, a "device command" is a loop command containing a device address and which is normally recoded and sent across the device interface.

In typical operation, any TLA in a slot group may bid for the use of the slot by sending an Attention (service request) command (i.e., one which contains the address of the requesting device). Other TLA's in the same slot group receiving this Attention or its echo (which is sent by a loop controller external to the TLA's) are automatically forced into Pass Mode. Alternatively, the controller can directly force all but one TLA of a slot group into Pass Mode by issuing a device command to the desired TLA.

Any TLA that is in Pass Mode will retransmit the loop bits without alteration. At the completion of a transaction, the loop controller may issue a Leave Passmode command, whereupon all TLA's in the group will revert to an idle state, able again to bid for the use of the slot. Alternatively, the controller may issue any of the device commands to any of the TLA's in the group, even though any or all of them may be in Pass Mode. The selected TLA will execute the command and leave Pass Mode, whereas all the other TLA's in the group will remain in (or revert to) Pass Mode.

The TLA microprogram allows a selected set of loop commands which are not device commands to also be executed even while the TLA is —and will remain in —Pass Mode.

Figure 17:
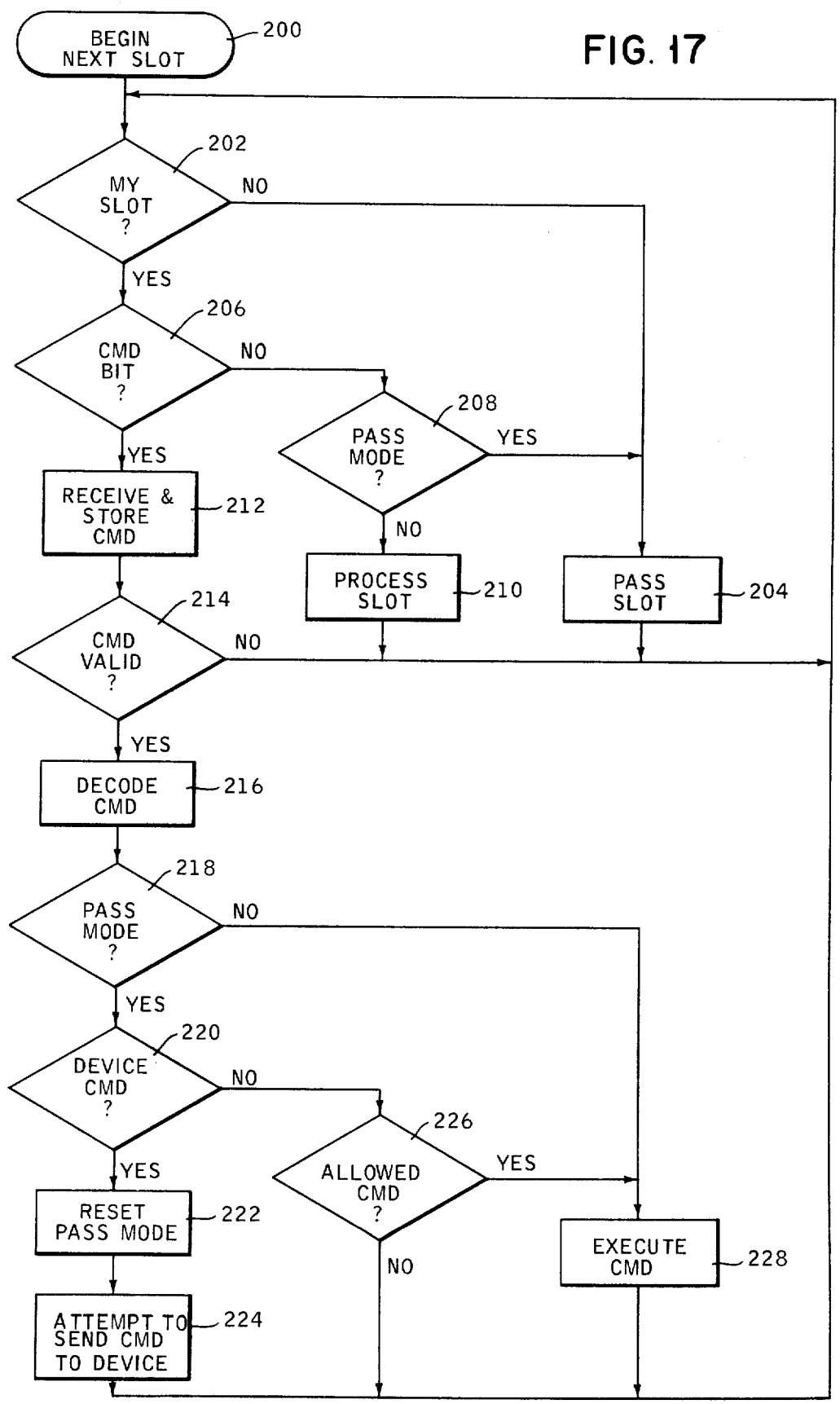
FIG. 17 is a flowchart of an example showing the operations necessary for performing slot sharing.

The major processes and decisions required to implement slot sharing are shown in the flowchart of FIG. 17. The essence of the microprogram for recognizing and executing a command is illustrated. For clarity, the explicit receipt and storage of the successive loop bits making up the slot is not indicated. Similarly, other functions such as updating counters, modifying status bits, etc., are implied but not shown. These details can be found in the above identified Bowman et al and McClearn et al applications.

Several assumptions underlie the flowchart:

1. The TLA is in slot sharing mode (see the aboveidentified Bowman et al patent application);

2. Frame sync has been acquired (see in aboveidentified McClearn et al patent application);

3. During the course of the slot previous to that being considered, the microprogram has effected the correct value for the RAM bit, "MYSLOT," (having previously incremented the slot counter and compared its value to the base slot and used other status information, as appropriate). MYSLOT has thus been validated before the flow chart sequence and indicates whether or not the current slot belongs to the TLA in operation.

Typical operation during the course of receiving a slot is as follows: (Particular emphasis will be placed on the receipt of a command during the slot):

Block 200: Begin the receipt of the slot.
Block 202: Test MYSLOT.
Block 204: If MYSLOT decision was no, retransmit all the loop bits of this slot as received. (This block will periodically involve reverifying that the TLA is in Frame Sync by comparing the received loop bits against the established Frame Slot pattern.)

Block 206: (MYSLOT decision was yes.) Test the first ("command") bit of the incoming slot.

Block 208: (The command bit of the slot was reset indicating not a command.) If in Pass Mode, pass the slot, i.e. retransmit the received loop bits, Block 204. If not in Pass Mode, process the remaining bits of the slot as appropriate to the current status of the TLA, Block 210.

Block 212: (Command bit was set, indicating that a command is being received.) Store remaining bits of slot.

Block 214: Test validity of the command by comparing the first half of the slot (exclusive of the first two bits) with the second half. If the two halves do not compare, return to Block 200.

Block 216: (Command was valid.) Decode the command field to determine the type of command.

Block 218: Test the PASSMODE Latch. If not set, proceed to Block 228 and execute the command.

Block 220: (PASSMODE Latch was set.) If the decoded command is a device command, the following action is taken:

The PASSMODE Latch is reset (Block 222), the SELECT Register is loaded with the device address, the DOR is loaded with the device command, and the DORFULL Latch is set (all in Block 224). Thus an attempt is made by The TLA to send the command to the addressed device. As described in Section 5.5, if the addressed device is not attached, the PASSMODE Latch will automatically be set by the hardware. If the addressed device is, in fact, attached, it will accept the command and the PASSMODE Latch will remain reset until some future time.

Block 226: Some non-device commands are permissible in Pass Mode. This decision block inhibits execution of commands which are not permitted in Pass Mode.

Block 228: Execute the command. If the command is a device command, the same function as indicated for Block 224, and the same considerations stated there, apply here as well.

VIII. OUTPUT OPERATION (DEVICE NOT BUSY)

Figure 13:
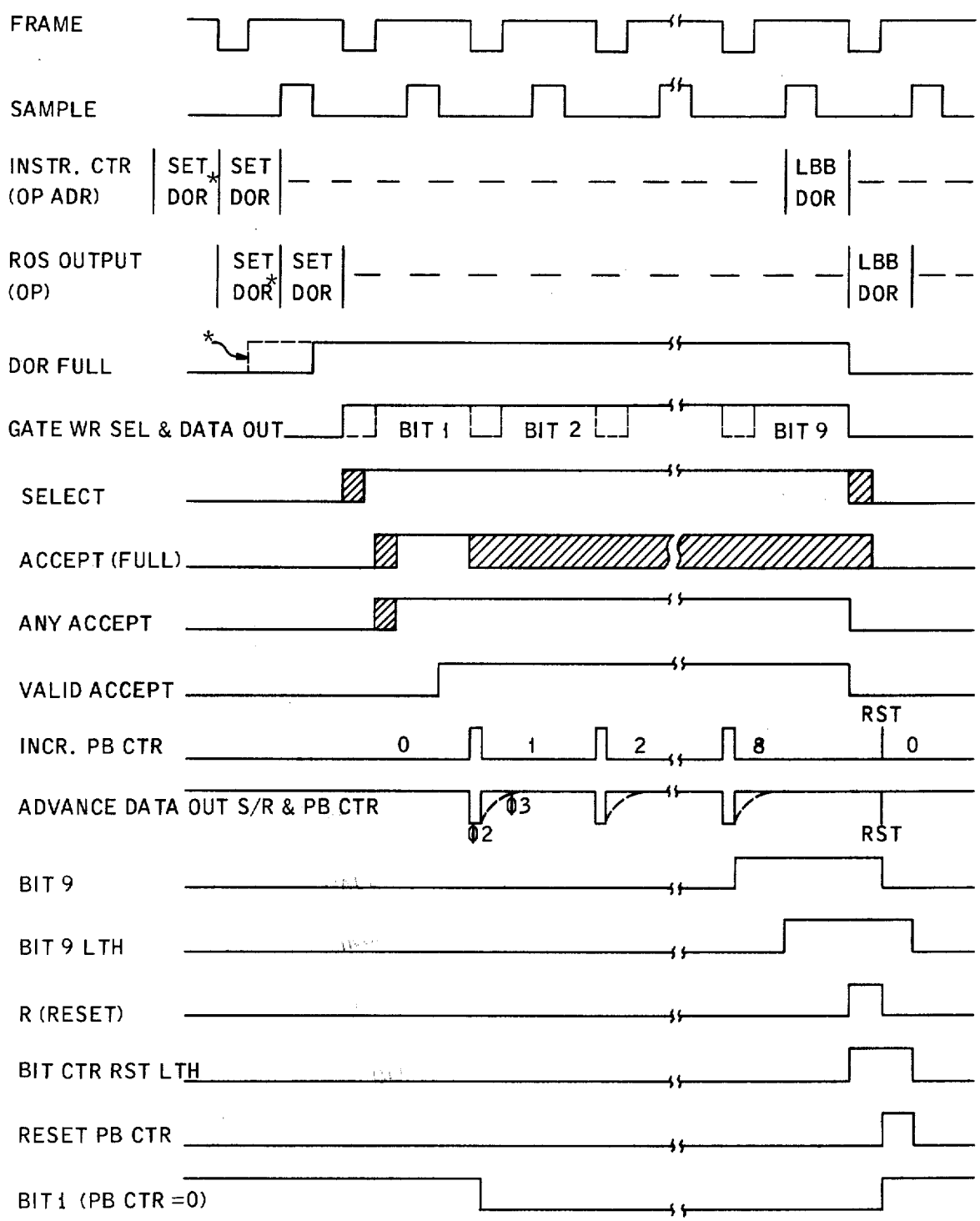
FIG. 13 is a timing diagram of an output operation-device not busy.

Refer to the timing chart of FIG. 13. External clocking waveforms, "Frame" and "Sample" are provided for clocking the I/O interface, (FIG. 9).

An output operation is initiated when a set DOR instruction in the microprogram sets the DOR FULL latch. As shown in FIG. 13, this operation has two possible timing relationships with FRAME and SAMPLE. The SET DOR instruction can occur in either of the two cycles shown in FIGS. 13 and 14 by the asterisk (*). The result is that DOR FULL latch is set early in one case as shown by the dotted waveform indicated by an asterisk (*). In either case SELECT (FIG. 5) becomes valid following the fall of the current FRAME. The return of ACCEPT from the selected device sets the ANY ACCEPT latch 64 immediately, and, if still present, sets the VALID ACCEPT latch 62 at the fall of SAMPLE. The nine data bits are gated out over the interface during subsequent successive FRAME times starting with the rise of SELECT. The poll bit counter counts the bits as they are sent and initiates a reset after the ninth bit has been transmitted. Reset of DOR FULL notifies the microprocessor that the output operation has been completed.

IX. OUTPUT OPERATION (DEVICE BUSY OR NOT EQUIPPED)

Figure 14:
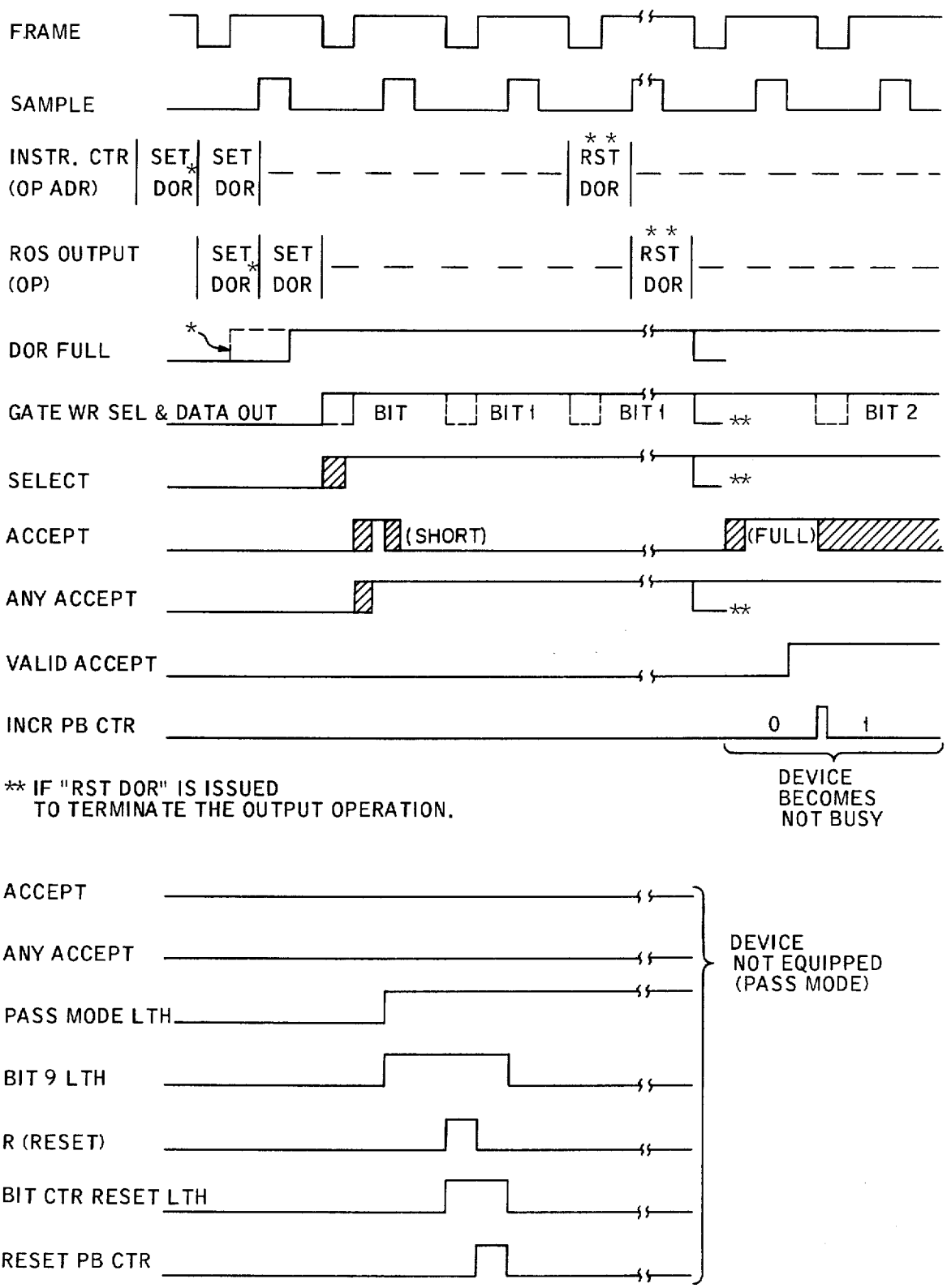
FIG. 14 is a timing diagram of an output operation-device busy or not equipped.

Refer to the timing chart of FIG. 14. If an output operation selects a busy device a short accept pulse is returned. This short accept sets the ANY ACCEPT latch 64 (FIG. 9) but is gone before the fall of SAMPLE and therefore does not set the VALID ACCEPT latch 62. The interface logic holds the SELECT lines valid and DOR DATA valid and waits for a full ACCEPT. The microprocessor can continue with other operations including WAIT FOR REC while waiting for the output operation to be completed. Arrival of a full ACCEPT sets the VALID ACCEPT latch and the output operation proceeds as described in Section VIII for a device not busy.

If the selected device is not equipped, i.e., not attached (and the PASS MODE I/O line is tied down) neither a full nor a short ACCEPT will be received. In this case the PASS MODE latch (FIG. 6) is set instead of ANY ACCEPT and the output operation, including the reset of DOR FULL, is terminated. In this situation the TLA is said to be in PASS MODE.

X. INPUT OPERATION (POLLING AND DATA IN)

Figure 15:
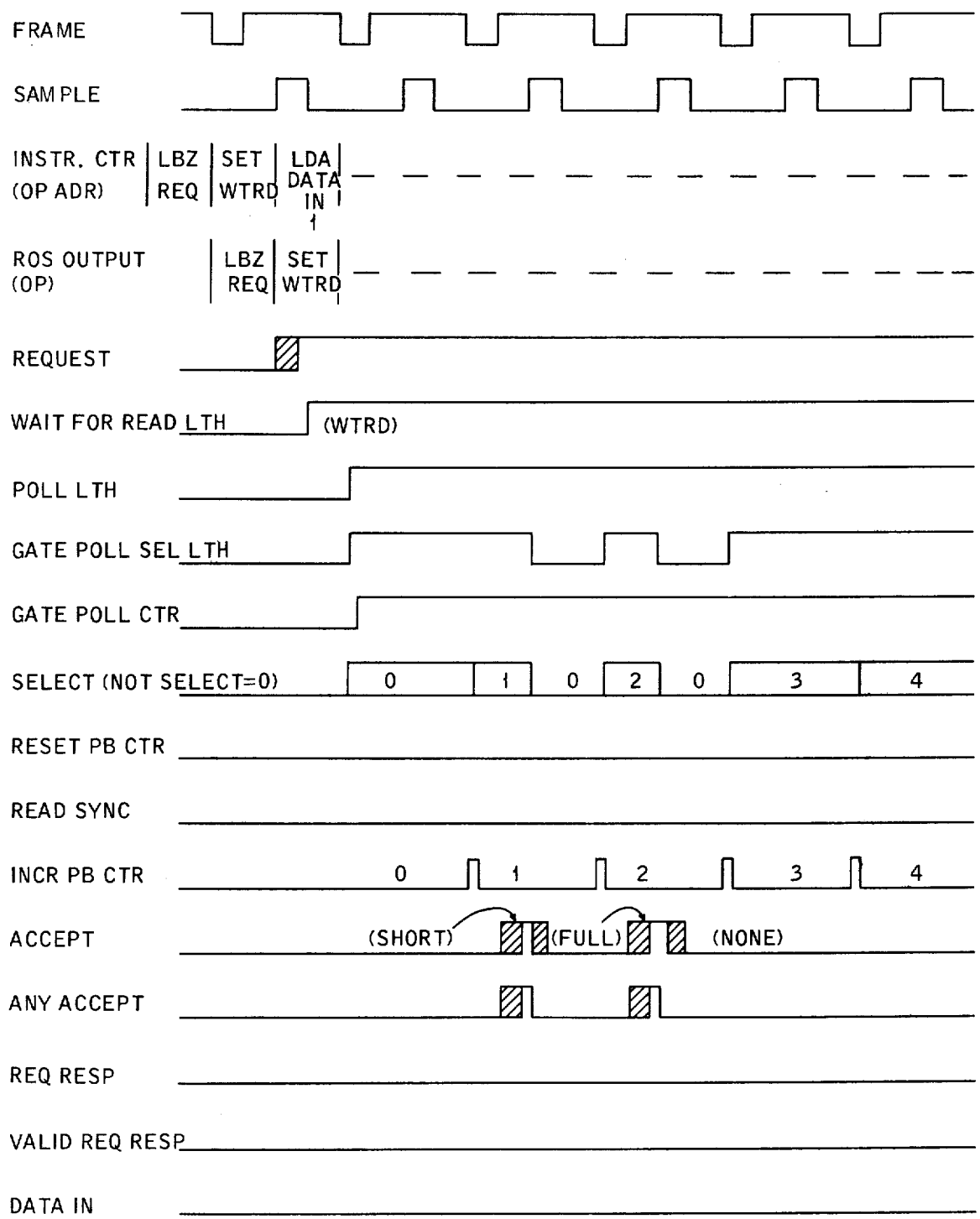
Figure 16:
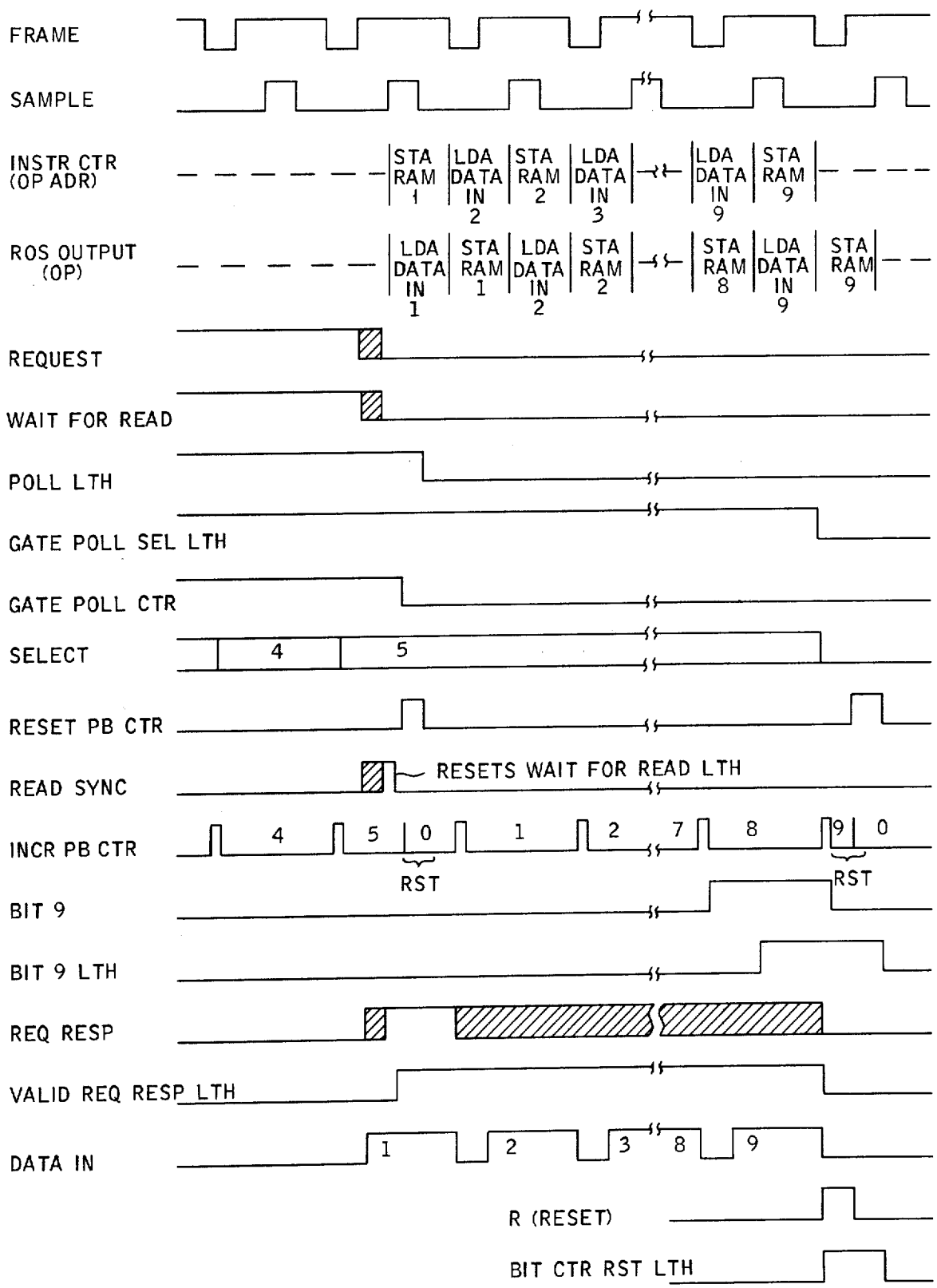

Refer to the timing charts of FIGS. 15 and 16. I/O devices that have data to send or require attention initiate an input operation by raising the multiplex-in REQUEST line (FIG. 2). The microprogram tests the state of this line whenever it is ready to service an input request. Load accumulator from the REQUEST source and Branch on zero are the instructions for making this test. If one of the devices has raised REQUEST, the branch will not be taken. The next instruction, Set WAIT for READ, initiates the input operation and places the processor in the WAIT state. Since the source of the request is unknown, a polling operation finds the address of the requesting device. The POLL, GATE POLL SEL and GATE POLL CTR latches (FIG. 11) are set on and an incidental reset is issued to the POLL CTR (FIG. 8) even though it will have been set to zero at the end of any previous usage. The contents of the poll counter are connected via the SEL S/R 34 (FIG. 5) to the I/O interface SELECT lines. However address zero is the same as the not-select case. At the fall of the next FRAME and INCR PB CTR pulse steps the poll counter to address 1. If, as shown in FIG. 15, selected device 1 happens to be busy, a short ACCEPT is returned. This signal resets GATE POLL SEL and thereby drops SELECT. At the fall of the next FRAME and INCR PB CTR pulse steps the poll counter to address 2 and the GATE POLL SEL latch is again set on to SELECT device 2. If, as shown in FIG. 15, device 2 happens to be ready to accept output data it responds to SELECT with a full accept. Operation of the TLA is the same as for the short accept. The device in this case however responds to the fall of SELECT by in turn dropping ACCEPT. The poll bit counter steps to the next higher address at the fall of each succeeding frame until the requesting device is selected. When this occurs, as shown for device 5, REQUEST drops and REQ RESP rises. The latter signal resets WAIT FOR READ (FIG. 6) to restart the microprogram, resets the GATE POLL CTR latch to hold the polled address in the SEL S/R, sets VALID REQ RESP (FIG. 11), resets the PB CTR so that it can be used to count data bits and resets the POLL LATCH. The first bit is at DATA IN at this time and the first instruction shown, following exit from the WAIT state, is LDA, DATA IN which loads this bit into the accumulator. The second instruction stores this bit in RAM and the third instruction reads the second data bit. In general there are two instruction times per bit so that the microprocessor can handle the data rate. After bit 9 has been received the POLL and VALID REQ RESP latches are reset, the PB CTR is reset and the SELECT lines are dropped to terminate the operation. The address of the polled device is left available in the SEL S/R for possible use in assembling an ATTENTION command for the device.

XI. SUMMARY

What has been described is apparatus for use in establishing and maintaining communication with a controlling module which transmits data and control commands serially by bit. The apparatus also communicates with one or more input/output devices over a demand/response interface.

The apparatus is comprised of a microprocessor with a serial data path organization and a one bit arithmetic logic unit. The arithmetic logic unit includes a accumulator which performs the dual function of storing the results of an arithmetic operation and acting as an input/output port to the serial interface.

A Presend latch is provided for storing a single bit prior to retransmission to the controlling module. Bits received on the serial interface are simultaneously stored in the accumulator and the Presend latch. If the data is to modified by the microprocessor, the contents of the Presend latch are changed, otherwise the data is retransmitted unmodified to the controlling module. In this manner the device can operate on a serial synchronous loop transmission system. The bits stored in the accumulator can be modified by arithmetic instructions, transferred to the pre-send latch for retransmission or transferred to the microprocessors Random Access Memory (RAM) for assembly and distribution The microprocessor is provided with instructions which perform connective operations, move operations, set operations, branch operations, and arithmetic operations. With this instruction set complete communication facilities are provided including receiving and storing successive serial bits in the RAM and sending successive bits to the serial interface. Further, the inverting and transmitting of a bit can be accomplished by inverting the accumulator contents and moving the inverted bits to the presend latch.

On the device side of the apparatus, data can be sent and received from a device by loading bits into he accumulator and shifting the bits from the accumulator into device input/output registers for transmission to the device.

Further uses of the instructions include testing for specific bit patterns, comparing two fields with appropriate branch operations, and decoding bit fields for performing such operations and address comparison and command decoding.

Bits received on the serial interface are synchronized by logic which establishes bit synchronization and generates a restart pulse at bit receive time. An instruction in the microprocessor program sets a latch Set Wait For Receive which places the microprocessor in the wait state during which program execution is suspended. At bit receive time, in response to the restart pulse, the set wait for receive latch is reset and the program restarts. Under program control, the receive bit is transferred to he Random Access Memory where it is assembled and wherein the program performs operations such as decoding commands.

Data transfer between the device and the microprocessor is accomplished under program control. An instruction in the microprogram sets a wait for read latch which places the microprocessor in the wait state. This instruction also activates polling logic which polls I/O devices by sequencing through sequential addresses. When an I/O device recognizes its own address, it responds by raising request response. The address of the device is held in a select shift register to maintain connection with the device. The request response signal resets the poll counter which now becomes a bit counter to count bits received from the device. It also resets Wait for Read which restarts the program which now under program control gates the data from the I/O device into the Random Access Memory.

The apparatus has the advantage that it requires a minimum amount of logic to implement and features serial input and output ports to reduce the number of external connection lines.

The invention also features completely autonomous synchronization and interlock control between the apparatus and the controlling module on one side and the apparatus and I/O devices on the other side.

Novel controls are provided to place the microprocessor in the wait state to suspend instruction execution and wait until the next serial bit is received at the accumulator or I/O device data is received over the I/O interface.

The microprocessor organization features a single bit arithmetic logic unit and a number of serial bus data paths to perform logical connectives in a serial by bit mode of operation to reduce the size and complexity of logic.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. Apparatus for use in establishing and maintaining communication with a controlling module (which transmits data and control commands serially by bit over a serial transmission medium) and one or more I/O modules comprising:
   an arithmetic unit;
   a buffer;
   first means connecting said buffer to said arithmetic unit for enabling the storing in said buffer of the result of an arithmetic operation performed by said arithmetic unit;
   second means connecting said buffer to said serial transmission medium for providing a second input to said buffer for enabling the storing, in said buffer, of a bit of data received over said transmission medium;
   a plurality of source data paths connected to respective sources of data, including data from said I/O modules;
   an input bus operatively connected to said arithmetic unit;
   source switching means connected to said source data paths and said input bus, energizable for connecting selected ones of said source data paths to said input bus; and
   stored program control means, connected to said arithmetic unit and to said switching means, including means for storing sequential program instructions, said instructions including arithmetic instructions executable by said arithmetic unit, to perform arithmetic operations and control instructions for selectively energizing said switching means to thereby connect selected source data paths to said input bus in accordance with control information contained in said instructions.

2. The combination according to claim 1 further including:
   a plurality of destination data paths, including the output of said buffer and said input bus;
   an output bus; and
   destination switching means connected to said destination paths, and said output bus, energizable by said stored program control means for connecting selected ones of said destination data paths to said output bus.

3. The combination according to claim 2 wherein said serial transmission medium includes a send line connected to said controlling module, said apparatus further including:
   a further destination path connected to said send line and said destination switching means, whereby data in said buffer is transferrable, under control of said stored program control means, via said output bus over said further destination path and said send line to said controlling module by energizing said destination switching means to connect the output of said buffer to said output bus and to said further destination path.

4. Apparatus for use in establishing and maintaining communication with a controlling module (which transmits data and control commands serially by bit over a serial transmission medium) and one or more I/O modules, comprising:
   an accumulator;
   a one bit arithmetic unit;
   means connecting said accumulator to said arithmetic unit for storing, in said accumulator, the result of an arithmetic operation performed by said arithmetic unit;
   means connecting said accumulator to said serial transmission medium for storing, in said accumulator, a bit of data received over said transmission medium;
   a plurality of source data paths connected to respective sources of data, including said I/O modules;
   an input bus operatively connected to said arithmetic unit;
   source switching means connected to said source data paths and said input bus, energizable for connecting selected ones of said source data paths to said input bus; and
   stored program control means, connected to said arithmetic unit and to said switching means, for storing sequential program instructions, said instructions including a first instruction decodable to load said accumulator from a source for selectively energizing said switching means to thereby connect at least one of said source data paths to said input bus in accordance with control information contained in said first instruction.

5. The combination according to claim 4 further including:
- a plurality of destination data paths, including the output of said accumulator and said input bus; and output bus; and
- destination switching means connected to destination paths and to said output bus, energizable by said stored program control means in response to second instructions decodable to store the contents of said accumulator at a destination for connecting at least one of said destination data paths to said output bus.

6. The combination according to claim 5 wherein said serial transmission medium includes a send line connected to said controlling module, said apparatus further including:
- a further destination path connected to said send line whereby data in said accumulator is transferable, under control of said stored program control means, over said further destination path and said send line to said controlling module by energizing said destination switching means to connect the output of said accumulator to said further destination path.

7. Apparatus for use in establishing and maintaining communication with a controlling module (which transmits data and control commands serially by bit over a serial transmission medium, and one or more I/O modules comprising:
- an accumulator;
- an arithmetic unit;
- means connecting said accumulator to said arithmetic unit for storing, in said accumulator, the result of an arithmetic operation performed by said arithmetic unit;
- a pre-send buffer;
- means connecting said accumulator and said pre-send buffer to said serial transmission medium for storing, in both said accumulator and said pre-send buffer, a bit of data received over said transmission medium; and control means connected to said accumulator and said pre-send buffer, including means for storing sequential program instructions, for selectively modifying or not modifying the contents of said pre-send buffer in accordance with control information contained in said program instructions.

8. The combination according to claim 7 further including:
- a plurality of destination data paths, including the output of said accumulator;
- an output bus; and
- destination switching means connected to destination paths and said output bus, energizable by said control means for connecting selected ones of said destination data paths to said output bus.

9. The combination according to claim 8 wherein said serial transmission medium includes a send line connected to said controlling module, said apparatus further including:
- a further destination path connected to said send line whereby data in said accumulator is transferable to said pre-send buffer, thence via said send line to said controlling module by energizing said destination switching means to connect the output of said accumulator to said bus out and to the input of said pre-send buffer.

10. Apparatus for use in establishing and maintaining communication with a controlling module (which transmits data and control commands serially by bit over a serial transmission medium) and one or more I/O modules, comprising:
- an arithmetic unit;
- a buffer;
- first means connected said buffer to said serial transmission medium for storing a bit of data received over said transmission medium;
- second means connecting said buffer to said arithmetic unit for storing in said buffer the result of an arithmetic operation performed by said arithmetic unit;
- a memory;
- a plurality of source data paths connected to respective sources of data, including input data and request lines from said I/O modules, and a serial output from said memory;
- a serial input bus operatively connected to said arithmetic unit;
- source switching means connected to said source data paths and said input bus, energizable for connecting selected ones of said source data paths to said input bus;
- control means connected to said arithmetic unit, said switching means and said memory for storing sequential program instructions, including arithmetic instructions executable by said arithmetic unit, and control instructions, for selectively energizing said switching means to thereby connect selected source data paths to said input bus in accordance with control information contained in said instructions; and
- means connected to said control means for sequencing through said instructions.

11. The combination according to claim 10 further including:
- a one bit wide output bus;
- a plurality of destination data paths, including the output of said buffer and said input bus; and also including a data out line, select lines to said I/O module, and an input line to said memory; and,
- destination switching means connected to destination paths and said output bus, energizable for connecting selected ones of said destination data paths to said output bus.

12. Apparatus for use in establishing and maintaining communication with a controlling module (which transmits data and control commands serially by bit over a serial transmission medium) and one or more I/O modules, comprising:
- a one bit arithmetic unit;
- an accumulator;
- first means connecting said accumulator to said serial transmission medium for storing a bit of data received over said transmission medium;
- second means connecting said accumulator to said arithmetic unit for storing in said accumulator the result of an arithmetic operation performed by said arithmetic unit;
- a memory;
- a plurality of source data paths, connected to respective sources of data, including input data and request lines from said I/O modules, and a serial output from said memory;
- a serial input bus operatively connected to said arithmetic unit;

source switching means connected to said source data paths and said input bus, energizable for connecting selected ones of said source data paths to said input bus;

stored program means, connected to said arithmetic unit, said switching means and said memory, for storing sequential program instructions, including arithmetic instructions executable by said arithmetic unit, and control instructions for selectively energizing said switching means to connect selected source data paths to said input bus in accordance with control information contained in said program instructions; and means connected to said stored program means for sequencing through said instructions.

13. The combination according to claim 12 further including:

a serial output bus;

a plurality of destination data paths, including the output of said accumulator, said input bus, and also including a data output line, select lines to said I/O modules, and a serial input to said memory; and destination switching means connected to said destination paths and to said output bus, energizable in response to said stored program means for connecting selected ones of said destination data paths to said output bus.

14. Apparatus for use in establishing and maintaining communication with a controlling module (which transmits data and control commands serially by bit over a serial transmission medium) and one or more I/O modules, comprising:

an arithmetic unit;

an accumulator for storing the result of an arithmetic operation performed by said arithmetic unit;

a pre-send buffer;

means connecting said accumulator and said presend buffer to said serial transmission medium for storing a bit of data received over said transmission medium in both said accumulator and said pre-send buffer;

a memory, for storing data and instructions;

means connected to said memory for sequencing through said instructions;

a plurality of source data paths, connected to respective sources of data, including input data and request lines from said I/O modules, and a serial output from said memory;

a serial input bus operatively connected to said arithmetic unit;

source switching means connected to said source data paths and said input bus, energizable for connecting selected ones of said source data paths to said input bus; and means, including said arithmetic unit and said switching means, for executing sequential program instructions stored in said memory, including arithmetic instructions executable by said arithmetic unit, and control instructions for selectively energizing said switching means to thereby connect selected source data path to said input bus in accordance with control information contained in said instructions.

15. The combination according to claim 14 further including:

a serial output bus connected to an input to said memory;

a plurality of destination data paths, including the output of said accumulator, the input to said pre-send buffer, and said input bus, and also including a data line, and select lines to said I/O modules; and destination switching means connected to said destination paths and said output bus, energizable for connecting selected ones of said destination data paths to said output bus whereby data in said accumulator is modifiable by said program instructions and transferable via said output bus to said pre-send buffer.

16. Apparatus for use in establishing and maintaining communication with a controlling module (which transmits data and control commands serially by bit over a serial transmission medium) and one or more I/O modules, comprising:

synchronization means connected to said serial transmission medium for establishing bit synchronization with said data and control commands transmitted serially by bit over said serial transmission medium, including means for generating a restart pulse for each bit at the time the bit is received;

stored program control means, connected to said transmission medium including means for storing sequential program instructions for effecting the storing and forwarding of data in transit between said controlling module and said I/O modules in accordance with control information contained in said program instructions; and means energizable to a first state and a second state, connected to said control means and said synchronization means for stopping the sequential interpretation of instructions in response to an instruction which energizes said means to said first state, and for restarting the sequential interpretation of instructions in response to said restart pulse which energizes said means to said second state.

17. Apparatus for use in establishing and maintaining communication with a controlling module (which transmits data and control commands serially by bit over a serial transmission medium) and one or more I/O modules, comprising:

an arithmetic unit;

synchronization means connected to said serial transmission medium for establishing bit synchronization with said data and control commands transmitted serially by bit over said serial transmission medium, including means for generating a restart pulse for each bit at the time the bit is received;

an accumulator;

means connecting said accumulator and said arithmetic unit for storing in said accumulator the result of an arithmetic operation performed by said arithmetic unit;

a pre-send buffer;

means connecting said accumulator and pre-send buffer to said serial transmission medium and said synchronization means for storing, in both said accumulator and said pre-send buffer, a bit of data received over said transmission medium in response to said restart pulse;

stored program control means, connected to said transmission medium and said I/O modules, including means for storing sequential program instructions for effecting the storing, from said accumulator, and forwarding, from said pre-send latch, of data in transit between said controlling module and said I/O modules in accordance with control information contained in said program instructions; and
means energizable to a first state and a second state connected to said control means and said synchronization means for stopping the sequential interpretation of instructions in response to an instruction which energizes said means to said first state, and for restarting the sequential interpretation of instructions in response to said restart pulse which energizes said means to said second state.

18. Apparatus for use in establishing and maintaining communication with a controlling module (which transmits data and control commands serially by bit over a serial transmission medium) and one or more I/O modules, comprising:
    synchronization means connected to said serial transmission medium for establising bit synchronization with said data and control commands transmitted serially by bit over said serial transmission medium, including means for generating a restart pulse for each said bit at the time the bit is received;
    an instruction counter;
    stored program control means, connected to said transmission medium and to said I/O modules, including means for storing sequential program instructions selected by said instruction counter for effecting the storing and forwarding of data in transit between said controlling module and said I/O modules in accordance with control information contained in said program instructions; and
    a wait for receive latch connected to be set by an instruction interpreted by said control means and reset by a restart pulse from said synchronization means for inhibiting said instruction counter to thereby stop the sequential interpretation of instructions in response to said instruction and for restarting the sequential interpretation of instructions in response to said restart pulse.

19. Apparatus for use in establishing and maintaining communication with a controlling module and one or more I/O modules, comprising:
    means at said I/O module for generating a request response signal;
    stored program control means, connected to said controlling module and said I/O modules, including means for storing and interpreting sequential program instructions for effecting the storing and forwarding of data in transit between said controlling module and said I/O modules in accordance with control information containing in said program instructions; and
    interlock means connected to said control means and said I/O module for stopping the sequential interpretation of instructions in response to an instruction interpreted by said control means, and for restarting the sequential interpretation of instructions in response to said request response signal.

20. Apparatus for use in establishing and maintaining communication with a controlling module and one or more I/O modules, comprising:
    polling means for generating sequential addresses for transmission to said I/O modules to thereby select an I/O module desiring connection to said apparatus;
    means at said I/O module for generating a request response signal in response to an address presented to said I/O module by said polling means;
    stored program control means, connected to said controlling module and said I/O modules, including means for storing sequential program instructions for effecting the storing and forwarding of data in transit between said controlling module and said I/O modules in accordance with control information contained in said program instructions; and
    interlock means including means for activating said polling means and means connected to said control means and said I/O module for stopping the sequential interpretation of instructions in response to an instruction, and for restarting the sequential interpretation of instructions in response to said request response signal.

21. Apparatus for use in establishing and maintaining communication with a controlling module and one or more I/O modules, comprising:
    means at said I/O module for generating a request response signal;
    an instruction counter;
    stored program control means, connected to said controlling module and said I/O modules, including means for storing sequential program instructions selected by said instruction counter for effecting the storing and forwarding of data in transit between said controlling module and said I/O modules in accordance with control information contained in said program instruction; and
    a wait for read latch conneced to be set by an instruction interpreted by said control means and reset by said request response signal from said I/O module for inhibiting said instruction counter to thereby stop the sequential interpretation of instructions in response to said instruction, and for restarting the sequential interpretation of instruction in response to said request response signal.

22. Apparatus for use in establishing and maintaining communication with a controlling module (which transmits data and control commands serially by bit over a serial transmission medium) and one or more I/O modules, over an interface connecting said I/O modules, comprising:
    synchronization means connected to said serial transmission medium for establishing bit synchronization with said data and control commands transmitted serially by bit over said serial transmission medium, including means for generating a restart pulse for each bit at the time the bit is received;
    stored program control means, connected to said transmission medium including means for storing sequential program instructions for effecting the storing and forwarding of data in transit between said controlling module and said I/O modules in accordance with control information contained in said program instructions;
    first interlock means energizable to a first state and a second state connected to said control means and said synchronization means for stopping the sequential interpretation of instructions in response to a first instruction which energizes said first interlock means to a first state, and for restarting the sequential interpretation of instructions in response to said restart pulse which energizes said first interlock means to a second state, to thereby permit data to be transferred between said controlling module and said program control means;
    means at said I/O module for generating a request response signal; and second interlock means connected to said control means and said I/O module for stopping the sequential interpretation of instructions in response to a second instruction, and for restarting the sequential interpretation of instructions in response to said request response signal, to thereby permit data to be transferred between said program control means and said I/O module.

23. Apparatus for use in establishing and maintaining communication with a controlling module (which transmits data and control commands serially by bit over a serial transmission medium connecting said apparatus to said controlling module) and one or more I/O modules, over an interface connecting said apparatus to said I/O modules, comprising:

polling means for generating sequential addresses for transmission to said I/O modules to thereby select an I/O module desiring connection to said apparatus;

synchronization means connected to said serial transmission medium for establishing bit synchronization, including means for generating a restart pulse for each bit at the time the bit is received;

stored program control means, connected to said transmission medium including means for storing sequential program instructions for effecting the storing and forwarding of data in transit between said controlling module and said I/O modules in accordance with control information contained in said program instructions;

means energizable to a first state and a second state connected to said control means and said synchronization means for stopping the sequential interpretation of instructions in response to a first instruction which energizes said means to a first state and for restarting the sequential interpretation of instructions in response to said restart pulse, to thereby permit data to be transferred between said controlling module and said program control means;

means at said I/O module for generating a request response signal in response to an address presented to said I/O module by said polling means; and interlock means including means for activating said polling means and means connected to said control means and said I/O module for stopping the sequential interpretation of instructions in response to a second instruction, and for restarting the sequential interpretation of instructions in response to said request response signal, to thereby permit data to be transferred between said program control means and said I/O module.

24. Apparatus for use in establishing and maintaining communication with a controlling module (which transmits data and control commands serially by bit over a serial transmission medium connecting said apparatus to said controlling module) and one or more I/O modules, over an interface connecting said apparatus to said I/O modules, comprising:

synchronization means connected to said serial transmission medium for establishing bit synchronization, including means for generating a restart pulse for each bit at the time the bit is received;

an instruction counter;

stored program control means, connected to said transmission medium including means for storing sequential program instructions selected by said instruction counter for effecting the storing and forwarding of data in transit between said controlling module and said I/O modules in accordance with control information contained in said program instructions;

a wait for receive latch connected to be set by a first instruction interpreted by said control means and reset by a restart pulse from said synchronization means for inhibiting said instruction counter to thereby stop the sequential interpretation of instructions in response to said restart pulse, to thereby permit data to be transferred between said controlling module and said program control means;

means at said I/O module for generating a request response signal; and a wait for read latch connected to be set by a second instruction interpreted by said control means and reset by said request response signal from said I/O module for inhibiting said instruction counter to thereby stop the sequential interpretation of instructions in response to said second instruction, and for restarting the sequential interpretation of instructions in response to said request response signal, to thereby permit data to be transferred between said program control means and said I/O module.

25. For use in a communication system employing a line in the form of a continuous loop in which the loop passes through and is connected to each of a plurality of terminal adapters, at least one of said terminal adapters comprising:

a single-bit first register; a single-bit pre-send register; said registers coupled to the loop to record a received bit in said registers;

an address detector coupled to said first register for determining from a series of bits received in said first register when the address of a terminal adapter is received;

means connected to said pre-send register for altering the contents of said pre-send register;

switching means connected to said pre-send register and said loop for coupling signals from said pre-send register out to the loop; and timing means associated with said switching means for gating the contents of said pre-send register, to thereby synchronize the signals that are applied to the loop.

26. The combination according to claim 25 wherein said address detector comprises a microprocessor adapted to bit serial process said received bits in said first register for comparison with a terminal adaptor address to thereby determine that said adaptor is being addressed.

27. Apparatus for controlling the communication of data between a serial transmission medium and an input/output device, comprising:

data storage means for storing data;

stored program means for storing sequential program instructions;

arithmetic logic means for performing arithmetic and logical operations;

accumulator buffer means;

first connector means connecting said accumulator buffer means to said transmission medium for storing in said buffer means a bit of data received over said transmission medium;

second connector means connecting said accumulator buffer means to said arithmetic logic means for storing in said buffer means the result of an arithmetic operation performed by said arithmetic logic means;

one bit wide data in bus means for selectively connecting one of a plurality of data sources to a first input to said arithmetic logic means; said data sources including a data in line from said input/output device, and an output line from said data storage means;

third connector means connecting the output of said accumulator buffer means to a second input to said arithmetic logic means to enable said logic means to perform arithmetic operations on the contents of said accumulator buffer means together with one of said data sources;

one bit wide data out bus means for connecting the output of said accumulator buffer means selectively to one of a plurality of data destination paths; said data destination paths including an input line to said data storage means, a data out line to said input/output device, and said transmission medium;

source/destination decode means for selectively gating data sources to said data in bus means and said data out bus means selectively to said data destination paths; and fourth connector means connecting said stored program means to said source/destination decode means, to said data storage means, and to said arithmetic logic means to enable execution of said program instructions;

whereby data to be transferred between said serial transmission medium and said input/output device is assembled bit by bit in said data storage means for transfer along said data in and data out busses by said arithmetic logic unit and said source/destination decode means executing said sequential program instructions.

28. Apparatus for controlling the communication of data between a serial transmission medium and an input/output device, comprising:

data storage means for storing data;

stored program means for storing sequential program instructions;

arithmetic logic means for performing arithmetic and logical operations;

synchronization means connected to said serial transmission medium for generating a restart pulse for each bit received on said serial transmission medium;

restart means for generating a request response signal when data is available at said input/output device for transfer to said serial transmission medium;

instruction counter means responsive to said clock means for sequentially addressing the program instructions in said stored program means;

connector means connecting said stored program means to said data storage means and to said arithmetic logic means to enable execution of said program instructions;

first interlock means responsive to execution of a first program instruction for inhibiting further execution of said sequential program instructions, and responsive to said restart pulse for restarting execution of said sequential program instructions; and second interlock means responsive to execution of a second program instruction for inhibiting further execution of said sequential program instructions, and responsive to said request response signal for restarting execution of said sequential program instructions;

whereby data to be transferred between said serial transmission medium and said input/output device is assembled bit by bit in said data storage means for transfer by said arithmetic logic unit executing said sequential program instructions.

29. Apparatus for controlling the communication of data between a serial transmission medium and an input/output device, comprising:

data storage means for storing data;

stored program means for storing sequential program instructions;

clock means for generating a sequence of timing signals;

arithmetic logic means for performing arithmetic and logical operations;

accumulator buffer means;

first connector means connecting said accumulator buffer means to said transmission medium for storing in said buffer means a bit of data received over said transmission medium;

second connector means connecting said accumulator buffer means to said arithmetic logic means for storing in said buffer means the result of an arithmetic operation performed by said arithmetic logic means;

one bit wide data in bus means for selectively connecting one of a plurality of data sources to a first input to said arithmetic logic means; said data sources including a data in line from said input/output device, and an output line from said data storage means;

third connector means connecting the output of said accumulator buffer means to a second input to said arithmetic logic means to enable said logic means to perform arithmetic operations on the contents of said accumulator buffer means together with one of said data sources;

one bit wide data out bus means for connecting the output of said accumulator buffer means selectively to one of a plurality of data destination paths; said data destination paths including an input line to said data storage means, a data out line to said input/output device, and said transmission medium;

source/destination decode means for selectively gating data sources to said data in bus means and said data out bus means selectively to said data destination paths;

synchronization means connected to said serial transmission medium for generating a restart pulse for each bit received on said serial transmission medium;

restart means at said input/output device for generating a request response signal when data is available at said data in line;

instruction counter means responsive to said clock means for sequentially addressing the program instructions in said stored program means;

fourth connector means connecting said stored program means to said source/destination decode means, to said data storage means, and to said arithmetic logic means to enable execution of said program instructions;

first interlock means connected by a data destination path to said data out bus means responsive to execution of a first program instruction for inhibiting further execution of said sequential program instructions, and responsive to said restart pulse for restarting execution of said sequential program instructions; and second interlock means connected by a data destination path to said data out bus means responsive to execution of a second program instruction for inhibiting further execution of said sequential program instructions, and responsive to said request response signal for restarting execution of said sequential program instructions;

whereby data to be transferred between said serial transmission medium and said input/output device is assembled bit by bit in said storage means for transfer along said data in and data out busses by said arithmetic logic unit and said source/destination decode means executing said sequential program instructions.

* * * * *